(12) United States Patent
Keller et al.

(10) Patent No.: US 7,605,218 B2
(45) Date of Patent: Oct. 20, 2009

(54) SYNTHESIS OF ELASTOMERIC CARBORANE-SILOXANES BY HYDROSILATION REACTIONS

(75) Inventors: Teddy M Keller, Fairfax Station, VA (US); Manoj K. Kolel-Veetil, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/688,311

(22) Filed: Mar. 20, 2007

(65) Prior Publication Data

US 2007/0161770 A1    Jul. 12, 2007

Related U.S. Application Data

(62) Division of application No. 10/874,000, filed on Jun. 22, 2004, now Pat. No. 7,238,766.

(60) Provisional application No. 60/541,017, filed on Feb. 3, 2004.

(51) Int. Cl.
 *C08G 77/398* (2006.01)
(52) U.S. Cl. .................. 528/5; 528/32; 528/31
(58) Field of Classification Search .............. 528/5, 528/32, 31

See application file for complete search history.

(56) References Cited

U.S. PATENT DOCUMENTS 3,576,027 A * 4/1971 Fish ........................... 556/439
6,187,890 B1 * 2/2001 Fehn et al. ..................... 528/15

* cited by examiner

*Primary Examiner*—Kuo-Liang Peng
(74) *Attorney, Agent, or Firm*—John J. Karasek; Joseph T. Grunkemeyer

(57) ABSTRACT

A carborane-siloxane compound is provided having the repeat unit

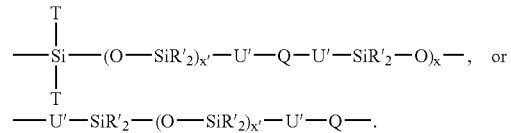

Q contains any of —$SiR_2$—, —$SiR_2$—O—, —C≡C—C≡C—, carboranyl, and U'. Each R and R' is alkyl, aryl, alkylaryl, haloalkyl, haloaryl, or mixtures thereof. Each U' is derivable from hydrosilation of an alkenyl or alkynyl group. Each T is alkyl, aryl, alkylaryl, haloalkyl, haloaryl mixtures thereof, —(O—$SiR'_2$)$_x$H, or the repeat unit. Each x and x' is a positive integer. The compounds may be made be reacting a carborane-siloxane precursor having unsaturated end groups with a siloxane crosslinker in the presence of a hydrosilation catalyst.

4 Claims, 4 Drawing Sheets

SYNTHESIS OF ELASTOMERIC CARBORANE-SILOXANES BY HYDROSILATION REACTIONS

This application is a divisional application of U.S. patent application Ser. No. 10/874,000 filed on Jun. 22, 2004, now U.S. Pat. No. 7,238,766, which claims the benefit of U.S. Provisional Patent Application No. 60/541,017, filed on Feb. 3, 2004, each incorporated herein by reference.

BACKGROUND OF THE INVENTION

1. Field of the Invention

The invention relates generally to siloxane-carborane polymers.

2. Description of the Prior Art

Carboranylenesiloxanes are highly sought after high temperature, thermally and thermo-oxidatively stable materials, which have been of particular interest to aerospace and defense industries especially for use in sealing assemblies for landing gears, flight control, and fuel systems and in coating insulations for cables (Dvornic et al., *High temperature Siloxane Elastomers*, Huthig & Wepf, Heidelberg, Germany 1990). (All referenced publications and patents are incorporated by reference.) There is also a high demand for such materials in the electronic industry in the manufacture of resist layers of computer chips. However, the existing carboranylenesiloxanes are generally low molecular weight polymers, a fact that has precluded their use in applications requiring high molecular weight materials (Papetti et al., "A New Series of Organoboranes 7. Preparation of Poly m-carboranylenesiloxanes," *J. Polym. Sci. Part A*-1, 4, 1623 (1966); Mayes et al., "Carborane Polymers 4. Polysiloxanes," *Polym. Sci. Part A*-1, 5, 365 (1967)). A solution to this problem was devised by the introduction of unsaturated crosslinkable units in such materials, which on curing yielded extended polymer networks of sufficient strength for various applications (Henderson et al., "Synthesis and Characterization of Poly (carborane-siloxane-acetylene)," *Macromolecules*, 27(6), 1660 (1997)). In practice, all such derivatives on curing have been known to be converted to plastics, which have thus restricted their use to mainly structural components (Bucca et al., "Oxidation-resistant thermosets derived from thermal copolymerization of acetylenic monomers containing boron and silicon," *J. Polym. Sci. Part A: Polym. Chem.*, 37(23), 4356 (1999); Homrighausen et al., "Synthesis and characterization of a silarylene-siloxane-diacetylene polymer and its conversion to a thermosetting plastic," *Polymer*, 43(9), 2619 (2002)). However, in applications involving high temperature coatings, sealings, composites, etc., there is a need for elastomeric materials. There is also a need for the curing to be effected in an expeditious manner under an ambient or inert atmosphere. The existing methodologies for the curing of carboranylenesiloxanes with unsaturated internal or terminal crosslinkable groups are by thermal crosslinking of the unsaturated groups or by the crosslinking of these groups by the use of chloroplatinic acid ($H_2PtCl_6 \cdot 6H_2O$), a hydrosilation catalyst (Houser et al., "Hydrosilation routes to materials with high thermal and oxidative stabilities," *J. Polym. Sci. Part A: Polym. Chem.*, 36(11), 1969 (1998); U.S. Pat. Nos. 5,981,678 and 6,225,247). The thermal curing reaction requires a temperature between 250-400° C. for several hours, and the hydrosilation reaction using chloroplatinic acid requires several hours or days. These constraints inherent in the existing systems, in addition to the alluded tendency of the materials to be converted into plastics on curing, consequently have precluded the use of these systems in elastomeric applications.

It is believed that the inability to control the extent of curing in these materials is the main reason for their plasticity on curing, as it results in inordinately extensive crosslinked systems. For example, on thermal curing a known polymer poly (carboranesiloxane-acetylene) is so extensively crosslinked that it inevitably converts into a plastic. Houser and Keller reported previously that an extensively crosslinked system was produced from reaction of divinyl-terminated carboranesiloxane containing compound with poly(methylhydrosiloxane) in the presence of a hydrosilation catalyst resulting in the formation of a plastic. In this case, the unsuitability of the product's characteristic (brittleness) is compounded by the fact that a reaction time of several days was required to complete the curing. This is due to an inherent deficiency in the catalyst, which is an outcome of its associated mechanism. It has been well established that a hydrosilation catalyst such as chloroplatinic acid functions as a heterogeneous catalyst (Lewis et al., "Platinum-catalyzed hydrosilylation-colloid formation as the essential step," *J. Am. Chem. Soc.*, 108(23), 7228 (1986)). The Pt metal is converted into a colloidal form during the induction step and the catalysis occurs at the colloidal Pt. Unfortunately, chloroplatinic acid forms larger colloidal particles compared to other heterogeneous hydrosilation catalysts such as the Karstedt catalyst, $Pt[COD]_2$, etc, which can form very fine Pt colloids. Thus, the latter catalysts are infinitely superior to chloroplatinic acid, and hence, facilitate hydrosilation reactions in an expeditious manner. It is also known that these heterogeneous hydrosilation catalysts require the presence of $O_2$ to perform hydrosilation and hence, would not be effective as catalysts under an inert atmosphere (Lewis, "On the mechanism of metal colloid catalyzed hydrosilylation: proposed explanations for electronic effects and oxygen cocatalysis," *J. Am. Chem. Soc.*, 112(16), 5998 (1990)). For applications that have to be carried out under an inert atmosphere such as in composite fabrication or repair, this necessity of the heterogeneous catalysts for $O_2$ precludes their use as a catalyst in such applications.

In the literature, there is a plethora of examples of homogeneous hydrosilation catalysts especially of Pt and Rh metals (Skoda-Foldes et al. "Homogeneous Catalytic Hydrosilylation of the C=C Double Bond in the Presence of Transition-Metal Catalysts," *J. Organomet. Chem.*, 408(3), 297 (1991)). These catalysts have been established to perform hydrosilation reactions Linder an inert atmosphere. For example, homogeneous catalysts such as $Pt(PPh_3)_4$, $PtCl_2(PPh_3)_2$, $RhCl(PPh_3)_3$, $RhCl_3 \cdot 3H_2O$, $Rh(PPh)_3Cl$, etc. are known to facilitate a wide range of hydrosilation reactions under an inert atmosphere. Some of these reactions, even though being not as fast as the ones by heterogeneous catalysts such as Karstedt or $Pt(COD)_2$, do proceed at an appreciable rate. Another homogeneous catalyst $[Rh(COD)Cl]_2$ is known to catalyze the hydrosilation of butadiynes, which are close analogues of diacetylenes (Kusumoto et al., "Hydrosilylation of 1,4-Bis(trimethylsilyl)-1,3-butadiyne," *Chem. Lett.* 9, 1405 (1985); Tillack et al., "Hydrosilylierung von symmetrisch disubstituierten Alkinen und Butadiiien mit $L_2Ni(0)$-Butadiin-Komplexen [L=$Ph_3P$, ((o-Tol-O))$_3$P] als Katalysatoren," *J. Organomet. Chem.*, 532(1-2), 117 (1997); Tillack et al., "Catalytic Asymmetric Hydrosilylation of Butadiynes: A New Synthesis of Optically Active Allenes," *Tetrahedron Lett.*, 40(36), 6567 (1999)).

An example of a homogeneous hydrosilation catalyst that affects the catalysis at a rate that is comparable to that of heterogeneous hydrosilation catalysts is $Pt(acac)_2$, which functions under photochemical conditions. It is known to expediently and efficiently catalyze the hydrosilation of olefins in the presence of wavelengths of >350 nm (Lewis et al., "Platinum(II) Bis(β-diketonates) as Photoactivated Hydrosilation Catalysts," *Inorg. Chem.*, 34(12), 3182 (1995); Wang et al., "Photoactivated hydrosilylation reaction of alkynes," *J. Organomet. Chem.*, 665(1-2), 1 (2003)). An irradiation of an olefin and silane mixture in $CH_2Cl_2$ containing the catalyst with wavelengths of >350 nm for 10 min at ambient temperature is found sufficient to cause a high conversion of the olefin to the hydrosilated product. Another photochemical catalyst, which causes the hydrosilation of olefins expediently at mild temperatures, is $Fe(CO)_5$ (Randolph et al. "Photochemical reactions of ($\eta^5$-pentamethylcyclopentadienyl)dicarbonyliron alkyl and silyl complexes: reversible ethylene insertion into an iron-silicon bond and implications for the mechanism of transition-metal-catalyzed hydrosilation of alkenes," *J. Am. Chem. Soc.*, 108(12), 3366 (1986)).

SUMMARY OF THE INVENTION

The invention comprises a compound comprising a repeat unit as in Eq. (1).

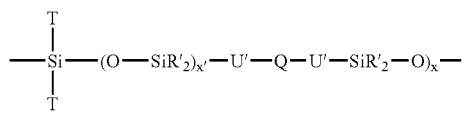

Q comprises groups selected from the group consisting of $-SiR_2-$, $-SiR_2-O-$, $-C\equiv C-C\equiv C-$, carboranyl, and U'. Each R and R' is independently selected from the group consisting of alkyl, aryl, alkylaryl, haloalkyl, haloaryl, and mixtures thereof. Each U' is an independently selected group derivable from hydrosilation of an alkenyl group or an alkynyl group. Each T is independently selected from the group consisting of alkyl, aryl, alkylaryl, haloalkyl, haloaryl, mixtures thereof, $-(O-SiR'_2)_xH$, and the repeat unit. Each x and x' is an independently selected positive integer.

The invention further comprises a compound comprising a repeat unit comprising the formula:

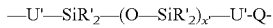

Q, R, R', U', and x' are as defined above.

The invention further comprises a process of making a compound comprising the steps of: providing a carborane-siloxane precursor as in Eq. (2), providing a siloxane crosslinker as in Eq. (3), and reacting the carborane-siloxane precursor with the siloxane crosslinker in the presence of a hydrosilation catalyst.

$$U-Q-U \quad (2)$$

Q comprises groups selected from the group consisting of $-SiR_2-$, $-SiR_2-O-$, $-C\equiv C-C\equiv C-$, carboranyl, and U. Each U is an independently selected alkenyl group or alkynyl group. Each R, R', and R'' is independently selected from the group consisting of curing or conversion to elastomers under ambient conditions in either inert or oxidizing conditions, and (8) the fabrication of elastomeric high temperature composite components.

The novel linear polymers of this disclosure are the first described elastomeric polymers and crosslinked networks containing carborane-siloxane-acetylene units in the backbone. The synthetic scheme affords a method for varying the concentration of carborane-siloxane and crosslinked siloxane-containing units in the elastomer by using advanced curing catalytic additives. Through crosslinking under ambient and photochemical conditions, the physical properties of the corresponding elastomers can be tailored. The network elastomeric systems show enhanced thermo-oxidative stability and may be used for structural and coating applications. With the uses of new curing additives of this invention, elastomeric components can be readily fabricated under ambient conditions in both inert and oxidizing environments.

In the first step of the process, a carborane-siloxane precursor as in Eq. (2) is provided. The carborane-siloxane precursor can be in the form of Eq. (4), where $C_b$ is a carboranyl group, and v and w are positive integers. Tie introduction of reactive end groups such as vinyl or ethynyl in carboranylenesiloxanes can open avenues for the utilization of the hydrosilation strategy to the production of elastomeric networks.

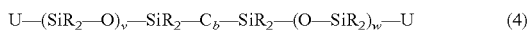

A suitable carboranyl group is $-CB_{10}H_{10}C-$, commonly known as carborane, which occurs in o- (1,2-), m- (1,7-), and p- (1,10-) forms. A suitable R group is, but is not limited to, methyl. Suitable U groups include, but are not limited to, an ethenyl group, an ethynyl group, and a diacetylene group. A suitable value for v and w is, but is not limited to, 1. Examples of the carborane-siloxane precursor include, but are not limited to, 1,7-bis(vinyltetramethyldisiloxyl)m-carborane and bis(ethynyltetramethyldisiloxyl)m-carborane. More than one carborane-siloxane precursor can also be used.

The carborane-siloxane precursor may be made be reacting a lithium-terminated oligomer with an excess of chlorine-terminated oligomer, followed by reacting with vinylmagnesium bromide or ethynylmagnesium bromide. Each oligomer may contain acetylene, siloxanes, and/or carboranes, including only one such group. By using an excess of chlorine-terminated oligomer, the resulting compound is also chlorine-terminated. Alternatively, the chlorine-terminated oligomer may be used without reacting with the lithium-terminated oligomer. Reaction with vinylmagnesium bromide or alkyl, aryl, alkylaryl, haloalkyl, haloaryl, and mixtures thereof, Each x is an independently selected positive integer. n is selected from the group consisting of 0, 1, and 2.

BRIEF DESCRIPTION OF THE DRAWINGS

A more complete appreciation of the invention will be readily obtained by reference to the following Description of the Example Embodiments and the accompanying drawings.

silane (3 C-Ls/Ph), that result in the reaction of one of the two reactive bonds of each ethynyl units.

Figure 4:
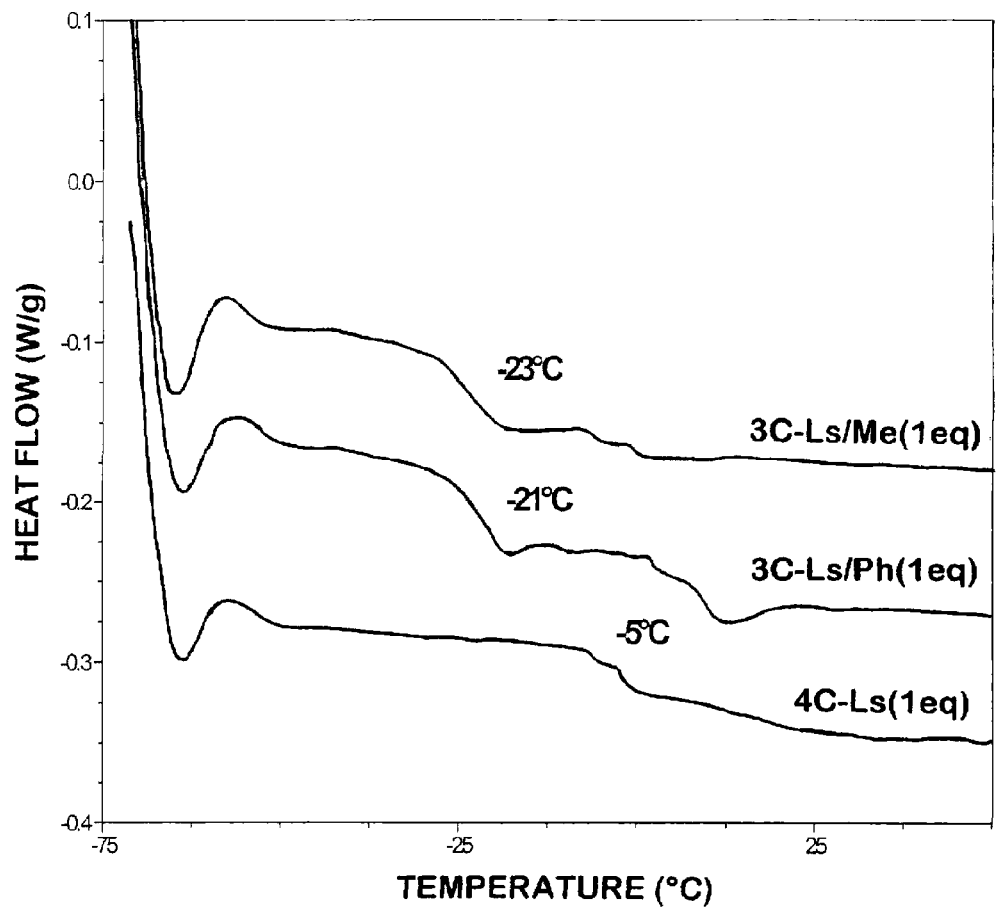

FIG. 4 shows $T_g$ plots for the reactions of 1,7-bis(ethynyltetramethyldisiloxyl)m-carborane respectively with tetrakis(dimethylsiloxy)silane (4 C-Ls), methyltris(dimethyldisiloxyl)silane (3 C-Ls/Me) and phenyl tris(dimethylsiloxy)silane (3 C-Ls/Ph), that result in the reaction of both of the two reactive bonds of each ethynyl units.

DETAILED DESCRIPTION OF THE EXAMPLE EMBODIMENTS

The hydrosilation reactions of this invention between carborane-siloxane precursors, containing unsaturated terminal or internal groups such as vinyl, ethynyl, diacetylene, etc., and branched or unbranched siloxane crosslinkers in the presence of homogeneous or heterogeneous hydrosilation catalysts may produce high performance elastomeric materials of thermally and thermo-oxidatively stable carboranylenesiloxane network systems.

Advantages of the invention may include: (1) the retention of elasticity in the cured carboranylenesiloxane network polymers, (2) the enhancement in the rate of curing, (3) the versatility of the reactants and the reaction conditions (4) the ability to tailor the properties of the elastomeric cured polymers, (5) the use of liquid precursors that can be readily formulated into shaped components, (6) the potential for repair of carbon-based components in outer space, (7) the ethylnylmagnesium bromide removes the chlorine and adds vinyl or ethynyl groups as the U groups. Suitable oligomers include, but are not limited to, 1,4-dilithiobutadiyne, chlorine-terminated siloxane-carborane oligomers, lithium-terminated siloxane-carborane oligomers, chlorine-terminated siloxane-acetylene oligomers, and chlorine-terminated siloxane-carborane-acetylene oligomers. Examples of such oligomers and their formation may be found in Keller et al., U.S. Pat. No. 5,272,237, and Keller et al., U.S. Pat. No. 5,981,678, both incorporated herein by reference.

In the second step of the process, a siloxane crosslinker as in Eq. (3) is provided. The siloxane crosslinker can be described as having a central silicon atom bonded to at least two hydrogen-terminated siloxane groups or chains. The remaining bonding sites on the central silicon are occupied by R″ groups. Suitable R″ groups include, but are not limited to, methyl and phenyl. Example forms of the siloxane crosslinker are shown in Eq. (5). Each x′, x″, and x‴ is a positive integer, such as 1 or 2.

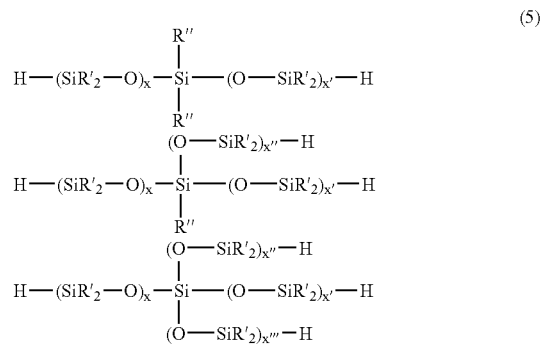

(5)

Suitable siloxane crosslinkers include, but are not limited to, tetrakis(dimethylsiloxy)silane, methyl tris(dimethylsiloxy)silane, phenyl tris(dimethylsiloxy)silane, 1,1,3,3,5,5-hexamethyltrisiloxane, and 1,1,3,3,5,5,7,7-octamethyltetrasiloxane. Such crosslinkers may be commercially available. More than one siloxane crosslinker can also be used.

In the final step of the process, the carborane-siloxane precursor is reacted with the siloxane crosslinker in the presence of a hydrosilation catalyst. This can form bonds between the unsaturated U groups in the carborane-siloxane precursor and the terminal silicon atoms in the siloxane crosslinker. The curing of the carboranylenesiloxane precursors using branched or unbranched siloxane crosslinkers can be performed under ambient conditions in either an oxidizing or an inert atmosphere using an appropriate catalyst. The reaction may occur by homogenous hydrosilation, non-aqueous heterogeneous hydrosilation, aqueous heterogeneous hydrosilation, or photochemical hydrosilation. Proper selection of the catalyst may be based upon its efficacy in a particular reaction condition that produces rapid curing. Suitable hydrosilation catalysts include, but are not limited to, Karstedt catalyst, Speier's catalyst, chloroplatinic acid, $Pt(COD)_2$, $Pt(PPh_3)_4$, $PtCl_2(PPh_3)_2$, $[Rh(COD)Cl]_2$, $PtCl_2(PhCN)_2$, $PtCl_2(diop)$, $PtCl_2(dppb)$, $RhCl(PPh_3)_3$, $Cp*Rh(C_2H_4)(SiR_3)H$, $RhCl_3 \cdot 3H_2O$, $Rh(PPh_3)_3Cl$, $[Cp*Rh]_2Cl_4$, $[Cp*Rh_2]Cl_3H$, $\{[Cp*Rh]_2(OH)_3\}^+$, $Me_2SiCp*_2Th(n-Bu)_2$, $Pt(acac)_2$, and $Fe(CO)_5$. More than one catalyst can also be used.

The dramatic enhancement in curing rate by the heterogeneous Karstedt catalyst and by the homogeneous $Pt(acac)_2$ may be the result of their associated catalytic mechanisms. The formation during the induction step of much finer Pt colloids in the case of the Karstedt catalyst, when compared to chloroplatinic acid, can dramatically enhance the rate of curing. While the catalysis was found to require up to 10 days with the latter, the former affords the same reaction instantaneously. By controlling the concentration of the catalyst and other reaction conditions, it may also been possible to control the reaction rate to any desired value. The production of finer colloidal particles may also be beneficial in the formation of void-free networks, which are generally not attained by the chloroplatinic acid-catalyzed curing. The utilized catalyst $Pt(acac)_2$ also affords a curing rate similar to that of the Karstedt catalyst.

The versatility of the hydrosilation reactions of this invention is shown by the range of reaction conditions and reactants that have been used for the production of cured network systems. The curing can be conducted in an oxidizing or an inert atmosphere. The reactions may be performed using neat reagents and under ambient conditions. The hydrosilation reactions can tolerate a broad range of functionalities and can also be conducted under a specific reaction condition such as a photochemical condition.

For controlling the exothermicity of the reaction and for uniformity during processing of the product, hexane may be used as a reaction medium. The hexane can be dry, as residual moisture can reduce the efficiency of hydrosilation. It has been well documented that the presence of moisture can lead to an increase in the formation of Si—Si products and $H_2$ during the catalyst initiation process. It can also poison the catalyst and introduce voids in the products.

The unbranched siloxane units can impact elasticity to the starting carborane-siloxane precursors. The hydrosilation reactions can facilitate these transformations in an expeditious manner, in either an oxidizing or an inert atmosphere and at ambient temperature. The materials of this invention can thus be used in the fabrication of high temperature fiber reinforced elastomeric composite components for military and domestic applications.

The product of the process is a compound that can have a repeat unit shown in Eq. 1. The compound may have only one repeat unit, be an oligomer, or be a linear polymer or crosslinked polymer. When a T group is also a repeat unit, the siloxane end of the T group is bonded to the Si of the first repeat unit. This results in a crosslinked structure, such as in Eq. (6). This structure shows T groups that are R″ groups, repeat units, and —(O—SiR′$_2$)$_x$H. A repeat unit T group is a carborane-siloxane precursor residue between two siloxane crosslinker residues. A —(O—SiR′$_2$)$_x$H T group is an unreacted hydrogen-terminated siloxane chain in the siloxane crosslinker. Methyl and phenyl are also suitable T groups. The compound may also have unreacted unsaturated terminal groups. Suitable unsaturated terminal groups include, but are not limited to, H$_2$C=CH—, HC≡C—, HC≡C—C≡C—, U—, and U-Q-.

The process may also make an oligomer from a carborane-siloxane precursor and a siloxane crosslinker having only two hydrogen-terminated siloxane chains. This can result in compounds as in Eq. (8), where a 2:1 molar ratio of precursor to crosslinker is used. The U′ groups can be —CH$_2$—CH$_2$—. This compound is also a carborane-siloxane precursor, as defined above, that includes unsaturated end groups, which can then be reacted with another siloxane crosslinker having three or four hydrogen-terminated siloxane chains to produce a thermoset.

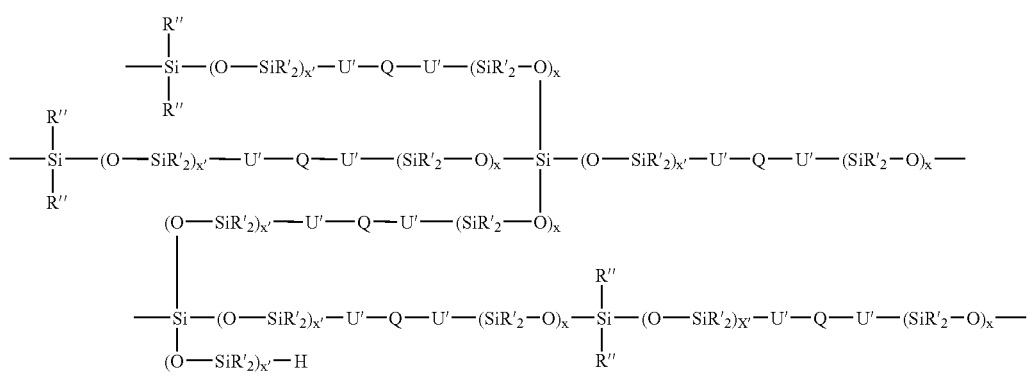

(6)

When the carborane-siloxane precursor has the form of Eq. 4, the compound can have any of the forms in Eq. (7).

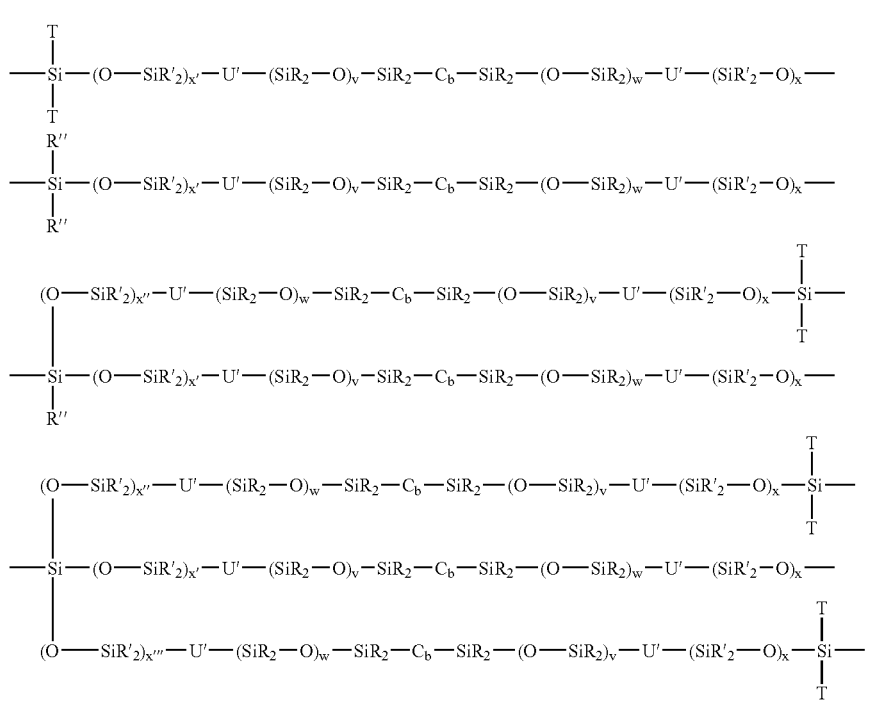

(7)

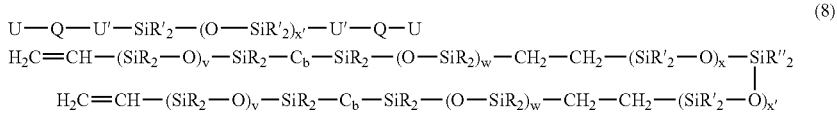

(8)

When a linear polymer or thermoset is made from an ethynyl-containing precursor, there may still be double bonds in the compound. These double bonds can react with another siloxane precursor to form a thermoset or to increase the crosslinking in a thermoset.

The U' group may be formed from a hydrosilation reaction, although the claimed compound is not limited to compounds made by hydrosilation. The type of unsaturated group and the number of hydrosilation reactions at the unsaturated group will determine the structure of U'. Suitable U' groups include, but are not limited to,

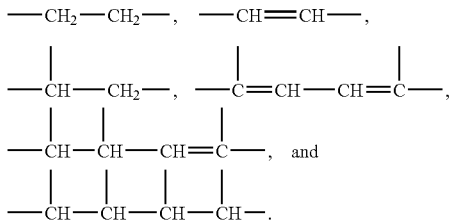

An example showing a trivalent U' made from the reaction of a diethynl precursor with a linear siloxane crosslinker, followed by reaction with another crosslinker is shown in formula (9).

achieved. This opens up several high temperature applications for the materials in the invention such as in coatings, composites, gaskets, etc. The compound may also be useful as a thermo-oxidative barrier or as an insulating material.

Figure 1:
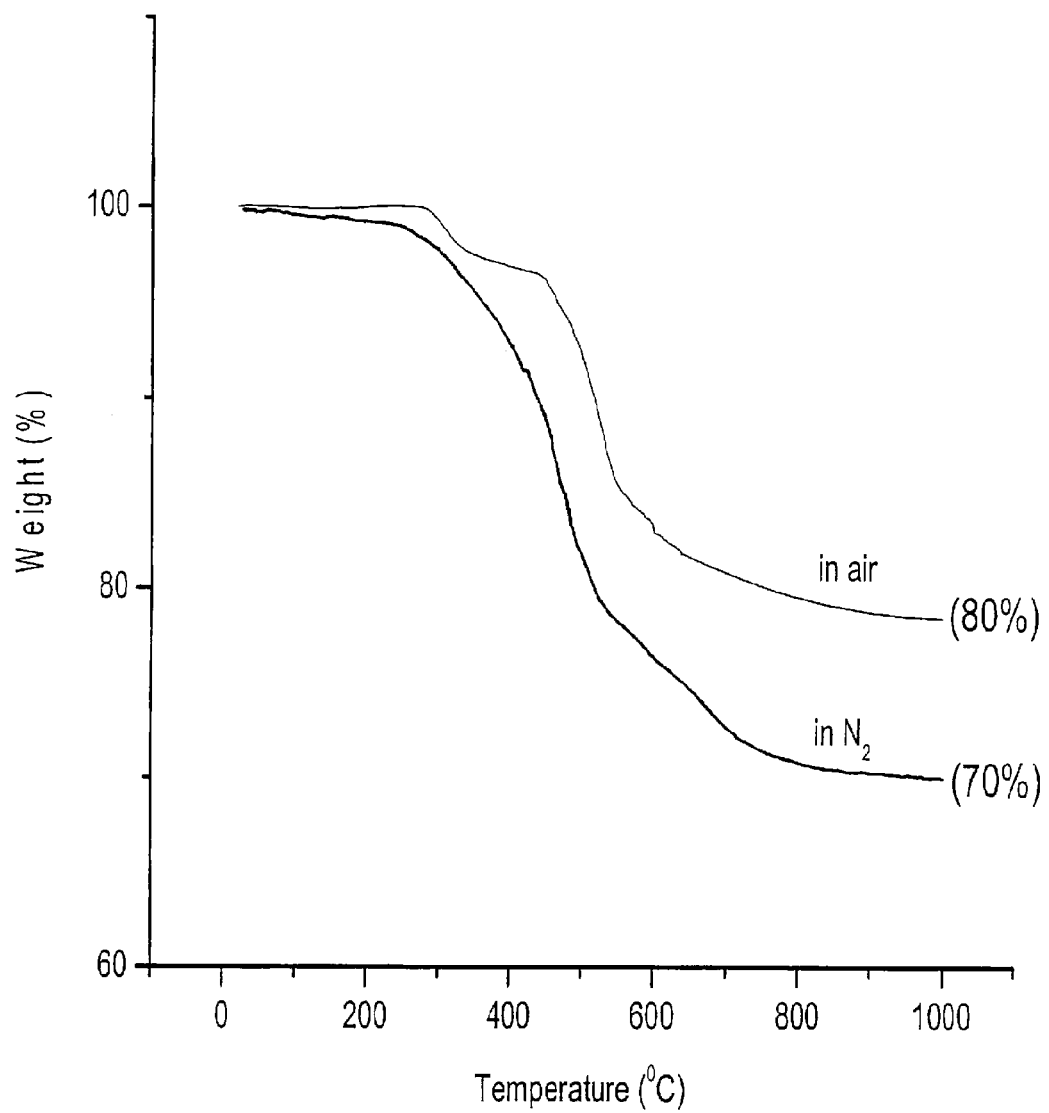
FIG. 1 shows TGA thermograms in $N_2$ and air of the network formed from 1,7-bis(vinyltetramethyldisiloxyl)m-carborane and tetrakis(dimethylsiloxy)silane.
Figure 2:
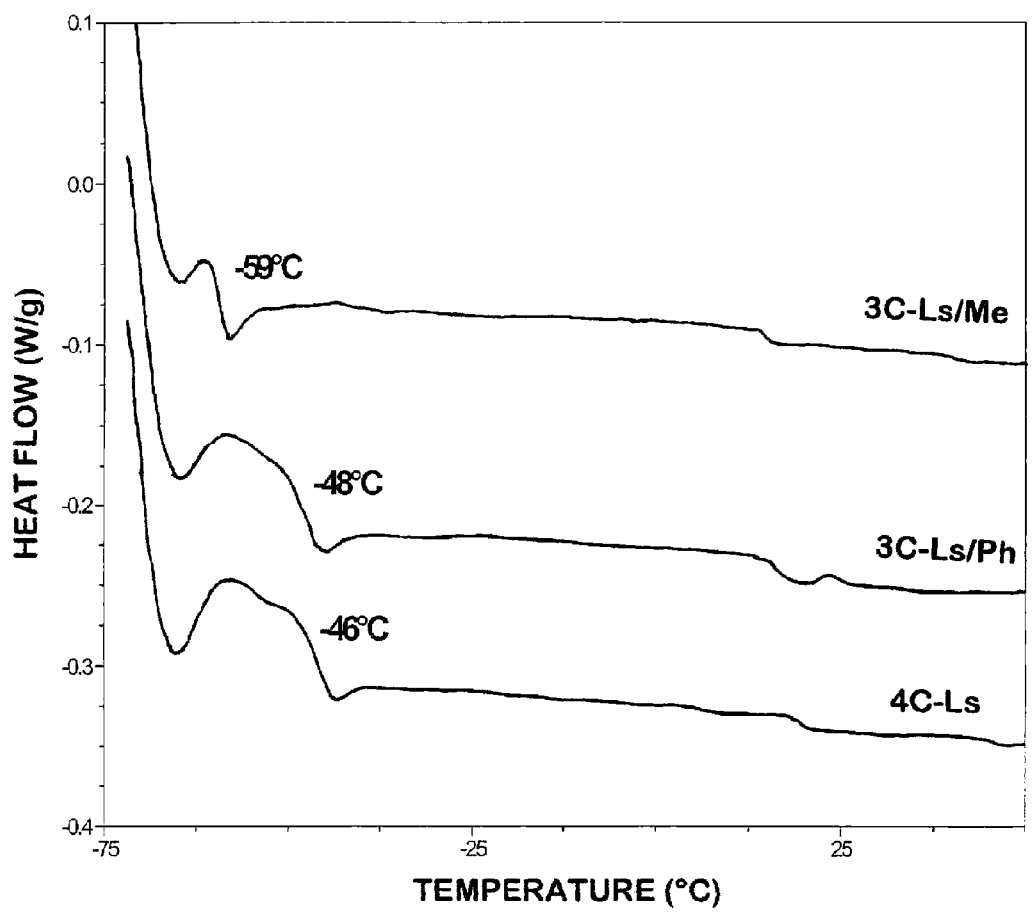
FIG. 2 shows $T_g$ plots for the respective reactions of 1,7-bis(vinyltetramethyldisiloxyl)m-carborane with tetrakis(dimethylsiloxy)silane (4 C-Ls), methyltris(dimethyldisiloxyl)silane (3 C-Ls/Me), and phenyl tris(dimethylsiloxy) silane (3 C-Ls/Ph).
Figure 3:
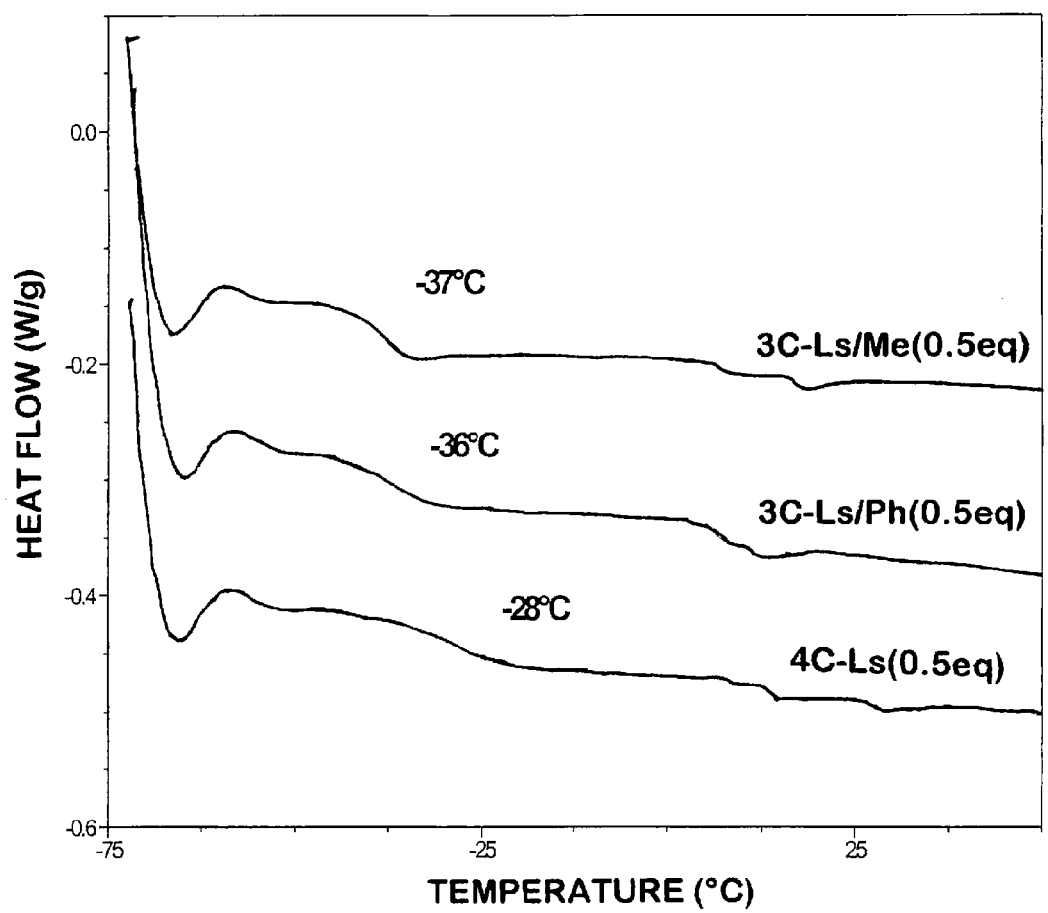
FIG. 3 shows $T_g$ plots for the reactions of 1,7-bis(ethynyltetramethyldisiloxyl)m-carborane respectively with tetrakis(dimethylsiloxy)silane (4 C-Ls), methyltris(dimethyldisiloxyl)silane (3 C-Ls/Me) and phenyl tris(dimethylsiloxy)

In a typical heterogeneous hydrosilation reaction of this invention, a suitable network may be formed when the carborane-siloxane precursor and the siloxane crosslinker are mixed in hexane at a Si—H:vinyl ratio of about 1.25:1 in the presence of the heterogeneous Karstedt catalyst. For example, when 1,7-bis(vinyltetramethyldisiloxyl)m-carborane (Eq. (10)) was reacted with tetrakis(dimethylsiloxy)silane (4 C-Ls) (Eq. (12)), a well-formed elastomeric and void-free network was obtained, which had high thermo-oxidative stabilities. (Refer to the thermograms (FIG. 1) in $N_2$ (char yield=70%) and in air (char yield=80%). The glass transition temperature of the formed network was also very low (−59° C.). The cured network formed was thus found to be elastomeric and thermally and thermo-oxidatively stable. FIG. 2 shows the $T_g$ plots for the respective reactions of 1,7-bis(vinyltetramethyldisiloxyl)m-carborane with tetrakis(dimethylsiloxy)silane (Eq. (12)), phenyl tris(dimethylsiloxy)silane (3 Cs-L/Ph) (Eq. (13)) and methyl tris(dimethylsiloxy)silane (Eq. (14)). FIG. 3 shows the $T_g$ plots for the respective reactions of 1,7-bis(ethynyltetramethyldisiloxyl)m-carborane (Eq. (11)) with tetrakis(dimethylsiloxy)silane (Eq. (12)), (9)

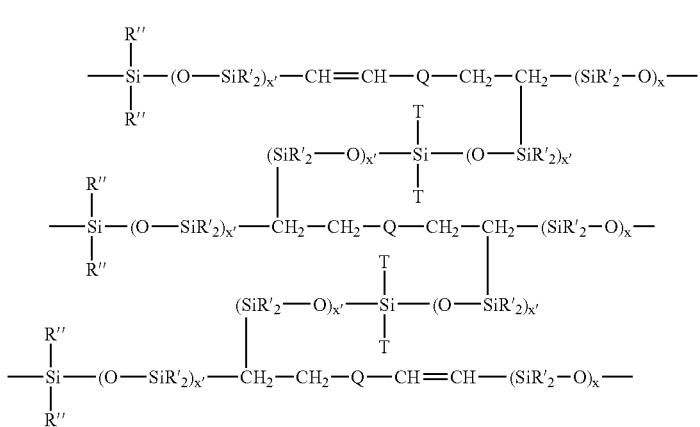

The compound may have elastomeric properties, depending on the groups used and the length of the siloxane groups. The retention of elasticity may be caused by the introduction of flexible siloxane groups in the carboranylenesiloxane precursors and the utilization of flexible crosslinkers with a lesser density of crosslinking sites for the curing reactions. As a result, the production of elastomeric, thermally and thermo-oxidatively stable carboranylenesiloxane networks can be phenyl tris(dimethylsiloxy)silane (3 Cs-L/Ph) (Eq. (13)) and methyl tris(dimethylsiloxyl)silane (Eq. (14)), so as to react one of the two reactive bonds of each of its ethynyl units. FIG. 4 shows the $T_g$ plots for the respective reactions of 1,7 bis(ethynyltetramethyldisiloxyl)m-carborane with tetrakis(dimethylsiloxy)silane, phenyl tris(dimethylsiloxy)silane (3 Cs-L/Ph) and methyl tris(dimethylsiloxyl)silane, so as to react both of the reactive bonds of each of its ethynyl units.

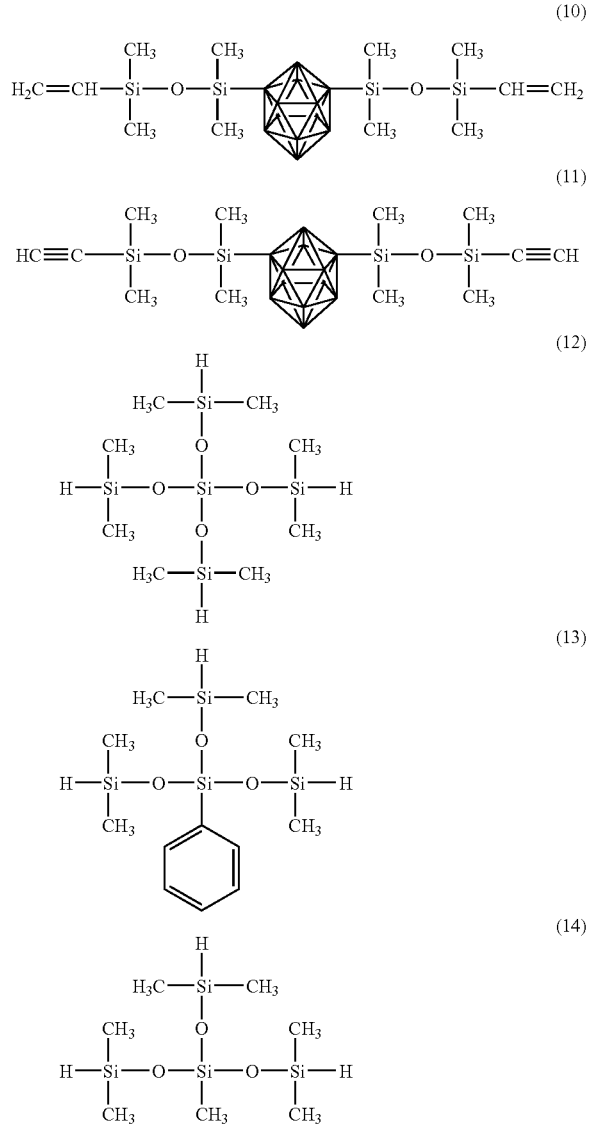

(10)
(11)
(12)
(13)
(14)

Alternatively, in a typical homogeneous reaction, a mixture of (he carborane-siloxane precursor and the siloxane crosslinker at a Si—H:vinyl ratio of 1.25:1 were mixed in $CH_2Cl_2$ under argon and placed in a quartz tube charged with a homogeneous catalyst such as $Pt(acac)_2$. The mixture was then irradiated with a wavelength of >350 nm for 30 minutes to yield a well-formed network system. The characteristics of the network formed under oxidizing and inert conditions were similar.

The feasibility of formation of networks by these hydrosilation reactions can depend substantially on the Si—H:vinyl ratios of the reactants. Hydrosilation reactions involving varying Si—H:vinyl ratios between the precursor and the crosslinker have shown that there can be an optimum ratio for the formation of well-formed network films. It was determined that a Si—H:vinyl ratio between 1.25:1 and 1.5:1 may work best. Hence, a ratio of 1.3:1 could be taken to be the optimum. Even though the basis for this increased Si—H:vinyl ratio has not been determined, it is believed that some portion of the excess crosslinker is lost in the initiation step of the catalyst in the form of Si—Si products.

When the precursor has ethynyl groups, including diacetylene, the amount of crosslinker can be adjusted to react with either one or both of the triple bonds in each ethynyl group. A higher Si—H:vinyl ratio can result in an increased $T_g$, possibly due to the formation of a tighter network. Further, ethynyl groups may result in a higher $T_g$ than ethenyl groups, even when only one bond in the ethynyl reacts. This could be attributed to the production of alkenyl links in the ethynyl precursor when compared to alkyl links in the ethenyl precursor after the hydrosilations of their reactive functionalities.

Having described the invention, the following examples are given to illustrate specific applications of the invention. These specific examples are not intended to limit the scope of the invention described in this application.

Thermogravimetric analyses (TGA) were performed on a SDT 2960 simultaneous DTA-TGA analyzer. The differential scanning calorimetry (DSC) studies were performed on a DSC 2920 modulated DSC instrument. All thermal experiments were carried out with heating rates of 10° C./min and a nitrogen flow rate of 100 cc/min. Infrared (IR) spectra were obtained on a Nicolet Magna 750 Fourier transform infrared spectrometer. Solution-state $^1H$ NMR and $^{13}C$ NMR spectra were acquired on a Bruker AC-300 spectrometer and referenced to the internal solvent peak (chloroform-d, or $CDCl_3$).

Syntheses of Reactive Carborane-Siloxane Precursors

Example 1

Synthesis of 1,7-bis(vinyltetramethyldisiloxyl)m-carborane—A flame-dried 250 mL Schlenk flask containing 1,7-bis(chlorotetramethyldisiloxyl)-m-carborane (26.36 g, 55.33 mmol) in THF (50 mL) was cooled in an ice bath. The solution was then treated with 111 mL of 1.0 M vinyl magnesium bromide (111 mmol), which was added slowly via syringe. After the addition was complete, the cold bath was removed and the resulting solution was allowed to stir at room temperature for two hours. The solution was quenched by addition of $Me_3SiCl$ (3-4 mL) and stirred for 30 min at room temperature. The reaction was then treated with diethyl ether (30 mL) and cold, saturated aqueous $NH_4Cl$ (40 mL). The organic layer was separated and the aqueous portion extracted with ether (2×30 mL). The organic extracts were combined, dried over $Na_2SO_4$, and the solution filtered through celite. After removal of volatiles with vacuum, the crude product was purified by column chromatography (two times, $SiO_2$) eluting with hexanes. Evaporation of solvent left a pure product (23.01 g, 90%). TR (KBr, $cm^{-1}$): 3050 ($v_{C—H}$ —$C_2H_3$), 2961 ($v_{C—H}$ Si—$CH_3$), 2596($v_{B—H}$), 1596 ($v_{CH—CH2}$), 1408 ($v_{—CH2\ bend}$), 1259 ($v_{Si—C}$), 1078 ($v_{Si—O}$), 794 ($v_{Si—C\ bend}$) $^1H$ NMR ($CDCl_3$, ppm): 0.167 (Si—$CH_3$), 0.169 (Si—$CH_3$), 5.681 (—$C_2H_3$), 5.695 (—$C_2H_3$), 5.748 (—$C_2H_3$), 5.761 (—$C_2H_3$), 5.918 (—$C_2H_3$), 5.934 (—$C_2H_3$), 5.968 (—$C_2H_3$), 5.983 (—$C_2H_3$), 6.046 (—$C_2H_3$), 6.095 (—$C_2H_3$), 6.112 (—$C_2H_3$), 6.162 (—$C_2H_3$). $^{13}C$ {$^1H$} NMR ($CDCl_3$, ppm): 0.14 (Si—$CH_3$), 0.56 (Si—$CH_3$), 68.49 (m-$C_2B_{10}H_{10}$), 132.16 (—$C_2H_3$), 138.61 (—$C_2H_3$).

Example 2

Synthesis of 1,7-bis(ethynyltetramethyldisiloxyl)m-carborane—A flame-dried 250 mL Schlenk flask containing 1,7-bis(chlorotetramethyldisiloxyl)-m-carborane (15.81 g, 33.11 mmol) in THF (30 mL) was cooled in an ice bath. The solution was then treated with 133 mL of 0.5 M ethynyl magnesium bromide (66.5 mmol), which was added slowly via syringe. After the addition was complete, the cold bath was removed and the resulting solution was allowed to stir at room temperature for two hours. The solution was quenched by addition of $Me_3SiCl$ (2-3 mL) and stirred for 30 min at room temperature. The reaction was then treated with diethyl ether (30 mL) and cold, saturated aqueous $NH_4Cl$ (40 mL). The organic layer was separated and the aqueous portion extracted with ether (2×30 mL). The organic extracts were combined, dried over $Na_2SO_4$, and the solution filtered through celite. After removal of volatiles with vacuum, the crude product was purified by column chromatography (two times, $SiO_2$) eluting with hexanes. Evaporation of solvent left a pure product (12.41 g, 82%). IR (KBr, cm$^{-1}$): 3290 ($v_{C-H}$—$C_2H_3$), 2964 ($v_{C-H}$ Si—$CH_3$), 2596 ($v_{B-H}$), 2039 ($v_{C-C}$), 1596 ($v_{CH-CH2}$), 1260 ($v_{Si-C}$), 1080 ($v_{Si-O}$), 798 ($v_{Si-C\ bend}$). $^1$H NMR (CDCl$_3$, ppm): 0.23 (Si—$CH_3$), 0.27 (Si—$CH_3$), and 2.41 (—$C_2H$). $^{13}C\{^1H\}$ NMR (CDCl$_3$, ppm): 0.25 (Si—$CH_3$), 1.89 (Si—$CH_3$), 68.15 (m-$C_2B_{10}H_{10}$), 88.58 (—CCH), 92.64 (—CCH).

Reaction of carborane-siloxane precursors with siloxane crosslinkers to form longer chain precursors

Example 3

Reaction of 1,7-bis(vinyltetramethyldisiloxyl)m-carborane with 1,1,3,3,5,5-hexamethyltrisiloxane—In a reaction vial was taken 0.2 g (0.434 mmol) of the product from Example 1. A 0.5 mL portion of distilled hexanes was added to the vial and the mix was thoroughly stirred using a mechanical stirrer for 2 min. Using a 500 μL syringe, a drop of a 2.1-2.4 wt % Pt-containing Karstedt hydrosilation catalyst solution (purchased from Gelest, which is also used in the rest of the examples unless otherwise mentioned) was added to the mixture and was thoroughly stirred for two more minutes as before. The linear cross-linking siloxane, 1,1,3,3,5,5-hexamethyltrisiloxane, (0.055 mL, 0.217 mmol) was added drop wise with vigorous stirring via syringe and the mixture was stirred for 2 more min as before. The catalysis was instantaneous. The mixture was then left open to air to evaporate off hexanes and was further vacuum dried at 75° C. for 2 hr to yield an oily product (99%). Spectral data for the trisiloxane-extenided product: [R (KBr, cm$^{-1}$): 3048 ($v_{C-H}$—$C_2H_3$), 2957 ($v_{C-H}$ Si—$CH_3$), 2598 ($v_{B-H}$), 1596 ($v_{CH-CH2}$), 1409 ($v_{-CH2\ bend}$), 1255 ($v_{Si-C}$), 1077 ($v_{Si-O}$), 789 ($v_{Si-C\ bend}$). $^1$H NMR (CDCl$_3$, ppm): 0.014(Si—$CH_3$), 0.055(Si—$CH_3$), 0.061(Si—$CH_3$), 0.148 (Si—$CH_3$), 0.155 (Si—$CH_3$), 0.409(—$C_2H_4$—), 5.666 (—$C_2H_3$), 5.680 (—$C_2H_3$), 5.732 (—$C_2H_3$), 5.747 (—$C_2H_3$), 5.902 (—$C_2H_3$), 5.917 (—$C_2H_3$), 5.952 (—$C_2H_3$), 5.966 (—$C_2H_3$), 6.030 (—$C_2H_3$), 6.080 (—$C_2H_3$), 6.101 (—$C_2H_3$), 6.146 (—$C_2H_3$). $^{13}C\{^1H\}$ NMR (CDCl$_3$, ppm): −0.57 (Si—$CH_3$), −0.51 (Si—$CH_3$), 0.15 (Si—$CH_3$), 0.58 (Si—$CH_3$), 0.63 (Si—$CH_3$), 1.34 (Si—$CH_3$), 9.45 (—$C_2H_4$—), 68.60 (m-$C_2B_{10}H_{10}$), 68.46 (m-$C_2B_{10}H_{10}$), 132.17 (—$C_2H_3$), 138.62 (—$C_2H_3$).

Example 4

Reaction of 1,7-bis(vinyltetramethyldisiloxyl)m-carborane and 1,1,3,3,5,5,7,7-octamethyltetrasiloxane—In a reaction vial was taken 0.2 g (0.434 mmol) of the product from Example 1. A 0.5 mL portion of distilled hexanes was added to the vial and the mixture was thoroughly stirred using a mechanical stirrer for 2 min. Using a 500 μL syringe, a drop of the Karstedt catalyst solution was added to the mixture and was thoroughly stirred for two more minutes as before. 0.071 mL (0.217 mmol) by volume of the linear cross-linking siloxane, 1,1,3,3,5,5,7,7-octamethyltetrasiloxane was added drop wise with vigorous stirring via syringe and the mix was stirred for 2 more min as before. The catalysis was instantaneous. The mixture was then left open to air to evaporate off hexanes and was further vacuum dried at 75° C. for 2 hr to yield an oily product (99%). Spectral data for the tetrasiloxane-extended product: IR (KBr, cm$^{-1}$): 3049 ($v_{C-H}$—$C_2H_3$), 2957 ($v_{C-H}$ Si—$CH_3$), 2591 ($v_{B-H}$), 1596 ($v_{CH-CH2}$), 1412 ($v_{-CH2\ bend}$), 1258 ($v_{Si-C}$), 1077 ($v_{Si-O}$), 796 ($v_{Si-C\ bend}$). $^1$H NMR (CDCl$_3$, ppm): 0.039(Si—$CH_3$), 0.064(Si—$CH_3$), 0.150(Si—$CH_3$), 0.157 (Si—$CH_3$), 0.416(—$C_2H_4$—), 5.669 (—$C_2H_3$), 5.683 (—$C_2H_3$), 5.736 (—$C_2H_3$), 5.750 (—$C_2H_3$), 5.905 (—$C_2H_3$), 5.919 (—$C_2H_3$), 5.954 (—$C_2H_3$), 5.969 (—$C_2H_3$), 6.034 (—$C_2H_3$), 6.083 (—$C_2H_3$), 6.100 (—$C_2H_3$), 6.149 (—$C_2H_3$). $^{13}C\{^1H\}$ NMR (CDCl$_3$, ppm): −0.58 (Si—$CH_3$), −0.54 (Si—$CH_3$), 0.15 (Si—$CH_3$), 0.57 (Si—$CH_3$), 0.61 (Si—$CH_3$), 1.24 (Si—$CH_3$), 9.43 (—$C_2H_4$—), 68.65 (m-$C_2B_{10}H_{10}$), 68.50 (m-$C_2B_{10}H_{10}$), 132.17 (—$C_2H_3$), 138.61 (—$C_2H_3$).

Example 5

Reaction of 1,7-bis(ethynyltetramethyldisiloxyl)m-carborane and 1,1,3,3,5,5-hexamethyltrisiloxane—In a reaction vial was taken 0.2 g (0.438 mmol) of the product from Example 2. 0.056 mL (0.219 mmol) of the linear cross-linking siloxane, 1,1,3,3,5,5-hexamethyltrisiloxane, was added drop wise with vigorous stirring via syringe and was stirred for two minutes. A 0.5 mL portion of distilled hexanes was added to the vial and the mix was thoroughly stirred using a mechanical stirrer for 2 min. Using a 500 μL syringe, a drop of the Karstedt catalyst solution was added to the mixture and was thoroughly stirred for two more minutes as before. The catalytic reaction was instantaneous. The mixture was then left open to air to evaporate off hexanes and was further vacuum dried at 75° C. for 2 hr to yield an oily product (99%). Spectral data for the trisiloxane-extended product: $^1$H NMR (CDCl$_3$, ppm): 0.058(Si—$CH_3$), 0.086 (Si—$CH_3$), 0.135 (Si—$CH_3$), 0.196(Si—$CH_3$), 0.219 (Si—$CH_3$), 0.227 (Si—$CH_3$), 2.32 (—$C_2H$), 6.569 (—CHCH—). $^{13}C\{^1H\}$ NMR (CDCl$_3$, ppm): 0.048 (Si—$CH_3$), 0.161 (Si—$CH_3$), 0.273 (Si—$CH_3$), 0.628 (Si—$CH_3$), 1.266 (Si—$CH_3$), 1.924 (Si—$CH_3$), 68.161 (m-$C_2B_{10}H_{10}$), 68.562 (m-$C_2B_{10}H_{10}$), 88.588 (—CCH), 92.641 (—CCH), 149.211 (—CHCH—), 150.882 (—CHCH—).

Example 6

Reaction of 1,7-bis(ethynyltetramethyldisiloxyl)m-carborane and 1,1,3,3,5,5,7,7-octamethyltetrasiloxane—In a reaction vial was taken 0.2 g (0.438 mmol) of the product from Example 2. 0.072 mL (0.219 mmol) of the linear cross-linking siloxane, 1,1,3,3,5,5,7,7-octamethyltetrasiloxane was added drop wise with vigorous stirring via syringe and was stirred for two minutes. A 0.5 mL portion of distilled hexanes was added to the vial and the mix was thoroughly stirred using a mechanical stirrer for 2 min. Using a 500 μL syringe, a drop of the Karstedt catalyst solution was added to the mixture and was thoroughly stirred for two more minutes as before. The catalytic reaction was instantaneous. The mixture was then left open to air to evaporate off hexanes and was further vacuum dried at 75° C. for 2 hr to yield an oily product (99%). Spectral data for the tetrasiloxane-extended product: $^1$H NMR (CDCl$_3$, ppm): 0.076(Si—$CH_3$), 0.155(Si—$CH_3$), 0.209(Si—$CH_3$), 0.229 (Si—$CH_3$), 0.247 (Si—$CH_3$), 2.39 (—$C_2H$), 6.574 (—CHCH—). $^{13}C\{^1H\}$ NMR (CDCl$_3$, ppm): 0.047 (Si—$CH_3$), 0.159 (Si—$CH_3$), 0.278 (Si—$CH_3$), 0.620 (Si—$CH_3$), 1.262 (Si—$CH_3$), 1.914 (Si—$CH_3$), 68.164 (m-$C_2B_{10}H_{10}$), 65.566 (m-$C_2B_{10}H_{10}$), 88.590 (—CCH), 92.645 (—CCH), 149.209 (—CHCH—), 150.886 (—CHCH—).

Reaction of carborane-siloxane precursors with siloxane crosslinkers to form linear polymer

Example 7

Reaction of 1,7-bis(vinyltetramethyldisiloxyl)m-carborane and 1,1,3,3,5,5-hexamethyltrisiloxane—In a reaction vial was taken 0.2 g (0.434 mmol) of the product from Example 1. A 0.5 mL portion of distilled hexanes was added to the vial and the mix was thoroughly stirred using a mechanical stirrer for 2 min. Using a 500 µL syringe, a drop of the Karstedt catalyst solution was added to the mixture and was thoroughly stirred for two more minutes as before. 0.11 mL (0.434 mmol) of the linear cross-linking siloxane, 1,1,3,3,5,5-hexamethyltrisiloxane, was added drop wise with vigorous stirring via syringe and the mix was stirred for 2 more minutes as before. The catalytic reaction was instantaneous. The mixture was then left open to air to evaporate off hexanes and was further vacuum dried at 75° C. for 2 hr to yield a viscous oil (99%). As there were no reactive vinyl groups in the product other than a few terminal vinyl groups, it would not be appreciably crosslinked further. However, the product was found to be useful as a coating material (ref: Example 62). Spectral data: IR (KBr, cm$^{-1}$): 3048 ($v_{C-H}$ —$C_2H_3$), 2957 ($v_{C-H}$ Si—$CH_3$), 2598 ($v_{B-H}$), 1255 ($v_{Si-C}$), 1077 ($v_{Si-O}$), 789 ($v_{Si-C\ bend}$). $^1$H NMR (CDCl$_3$, ppm): 0.014 (Si—CH$_3$), 0.055(Si—CH$_3$), 0.061(Si—CH$_3$), 0.148 (Si—CH$_3$), 0.155 (Si—CH$_3$), 1.109(—C$_2$H$_4$—). $^{13}$C{$^1$H} NMR (CDCl$_3$, ppm): −0.57 (Si—CH$_3$), −0.51 (Si—CH$_3$), 0.15 (Si—CH$_3$), 0.58 (Si—CH$_3$), 0.63 (Si—CH$_3$), 1.34 (Si—CH$_3$), 9.45 (—C$_2$H$_4$—), 68.60 (m-C$_2$B$_{10}$H$_{10}$), 68.46 (m-C$_2$B$_{10}$H$_{10}$). The resonances for the terminal vinyl groups appeared as very minor absorptions in both $^1$H and $^{13}$C NMR spectra.

Example 8

Reaction of 1,7-bis(vinyltetramethyldisiloxyl)m-carborane and 1,1,3,3,5,5,7,7-octamethyltetrasiloxane—In a reaction vial was taken 0.2 g (0.434 mmol) of the product from Example 1. A 0.5 mL portion of distilled hexanes was added to the vial and the mix was thoroughly stirred using a mechanical stirrer for 2 min. Using a 500 µL syringe, a drop of the Karstedt catalyst solution was added to the mixture and was thoroughly stirred for two more minutes as before. 0.142 mL (0.434 mmol) of the linear cross-linking siloxane, 1,1,3,3,5,5,7,7-octamethyltetrasiloxane, was added drop wise with vigorous stirring via syringe. The catalytic reaction was instantaneous. The mixture was then left open to air to evaporate off hexanes and was further vacuum dried at 75° C. for 2 hr to yield a viscous oil (99%). As there were no reactive vinyl groups in the product other than a few terminal vinyl groups, it would not be appreciably crosslinked further. However, the product was found to be useful as a coating material (ref: Example 63). Spectral data: IR (KBr, cm$^{-1}$): 3048 ($v_{C-H}$ —$C_2H_3$), 2957 ($v_{C-H}$ Si—$CH_3$), 2598 ($v_{B-H}$), 1255 ($v_{Si-C}$), 1077 ($v_{Si-O}$), 789 ($v_{Si-C\ bend}$). $^1$H NMR (CDCl$_3$, ppm): 0.014 (Si—CH$_3$), 0.055 (Si—CH$_3$), 0.061 (Si—CH$_3$), 0.148 (Si—CH$_3$), 0.155 (Si—CH$_3$), 1.008 (—C$_2$H$_4$—). $^{13}$C{$^1$H} NMR (CDCl$_3$, ppm): −0.57 (Si—CH$_3$), −0.51 (Si—CH$_3$), 0.15 (Si—CH$_3$), 0.58 (Si—CH$_3$), 0.63 (Si—CH$_3$), 1.34 (Si—CH$_3$), 9.45 (—C$_2$H$_4$), 68.60 (m-C$_2$B$_{10}$H$_{10}$), 68.46 (m-C$_2$B$_{10}$H$_{10}$). The resonances for the terminal vinyl groups appeared as very minor absorptions in both $^1$H and $^{13}$C NMR spectra.

Example 9

Reaction of 1,7-bis(ethynyltetramethyldisiloxyl)m-carborane and 1,1,3,3,5,5-hexamethyltetrasiloxane—In a reaction vial was taken 0.2 g (0.438 mmol) of the product from Example 2. 0.111 mL (0.438 mmol) of the linear cross-linking siloxane, 1,1,3,3,5,5-hexamethyltetrasiloxane was added drop wise with vigorous stirring via syringe and was stirred for two minutes. A 0.5 mL portion of distilled hexanes was added to the vial and the mix was thoroughly stirred using a mechanical stirrer for 2 min. Using a 500 µL syringe, a drop of the Karstedt catalyst solution was added to the mixture and was thoroughly stirred for two more minutes as before. The catalytic reaction was instantaneous. The mixture was then left open to air to evaporate off hexanes and was further vacuum dried at 75° C. for 2 hr to yield an oily product (99%). Spectral data: $^1$H NMR (CDCl$_3$, ppm): 0.034 (Si—CH$_3$), 0.048(Si—CH$_3$), 0.069(Si—CH$_3$), 0.146(Si—CH$_3$), 6.488 (—CHCH—). $^{13}$C{$^1$H} NMR (CDCl$_3$, ppm): 0.074 (Si—CH$_3$), 0.181 (Si—CH$_3$), 0.666 (Si—CH$_3$), 0.812 (Si—CH$_3$), 1.282 (Si—CH$_3$), 68.539 (m-C$_2$B$_{10}$H$_{10}$), 149.248 (—CHCH—), 150.931 (—CHCH—). The terminal ethynyl groups were present as very low intensity resonances at 88.588 (—CCH), 92.639 (—CCH).

Example 10

Reaction of 1,7-bis(ethynyltetramethyldisiloxyl)m-carborane and 1,1,3,3,5,5,7,7-octamethyltetrasiloxane—In a reaction vial was taken 0.2 g (0.438 mmol) of the product from Example 2. 0.144 mL (0.438 mmol) of the linear cross-linking siloxane, 1,1,3,3,5,5,7,7-octamethyltetrasiloxane was added drop wise with vigorous stirring via syringe and was stirred for two minutes. A 0.5 mL portion of distilled hexanes was added to the vial and the mix was thoroughly stirred using a mechanical stirrer for 2 min. Using a 500 µL syringe, a drop of the Karstedt catalyst solution was added to the mixture and was thoroughly stirred for two more minutes as before. The catalytic reaction was instantaneous. The mixture was then left open to air to evaporate off hexanes and was further vacuum dried at 75° C. for 2 hours to yield an oily product (99%). Spectral data: $^1$H NMR (CDCl$_3$, ppm): 0.057(Si—CH$_3$), 0.072(Si—CH$_3$), 0.156(Si—CH$_3$), 6.580 (—CHCH—). $^{13}$C{$^1$H} NMR (CDCl$_3$, ppm): 0.078 (Si—CH$_3$), 0.188 (Si—CH$_3$), 0.665 (Si—CH$_3$), 0.800 (Si—CH$_3$), 1.297 (Si—CH$_3$), 68.543 (m-C$_2$B$_{10}$H$_{10}$), 149.251 (—CHCH—), 150.925 (—CHCH—). The terminal ethynyl groups were present as very low intensity resonances at 88.590 (—CCH), 92.634 (—CCH).

Reaction of carborane-siloxane precursors with siloxane crosslinkers to form thermosets Example 11

Curing of the product from Example 1 with the cross-linker tetrakis(dimethylsiloxy)silane using the Karstedt catalyst (heterogeneous catalysis) (at a Si—H:vinyl ratio of 1.5:1)—In a reaction vial was added 0.2 g (0.434 mmol) of product from Example 1. A 0.5 mL portion of distilled hexanes was added to the vial and the mix was thoroughly stirred using a mechanical stirrer for 2 min. Using a 500 µL syringe, a drop of the Karstedt catalyst solution was added to the mixture and was thoroughly stirred for two more minutes as before. A 0.12 mL portion of tetrakis(dimethylsiloxy)silane (0.3255 mmol; Si—H:vinyl ratio of 1.5:1) was added via syringe to the mixture and was stirred vigorously for 2 min. The curing was instantaneous. The mixture may now be transferred to a Teflon mold to form films or be left in the vial to evaporate off the volatiles to yield a disk. The films or the disks formed were clear and were void-free. The thermal properties of the material were: Char yield at 1000° C. (in N$_2$): 70%. Char yield at 1000° C. (in air): 80%. Glass transition temperature (T$_g$): −46° C. The material formed was thus found to be elastomeric and thermally and thermo-oxidatively stable.

Example 12

Curing of product from Example 1 with the cross-linker tetrakis(dimethylsiloxy)silane using the Karstedt catalyst (at a Si—H:vinyl ratio of 1.25:1)—The curing in Example 11 was repeated with a Si—H:vinyl ratio of 1.25:1. However, the product was a harder solid than the one obtained in Example 11.

Example 13

Curing of product from Example 1 with the cross-linker tetrakis(dimethylsiloxy)silane using the Karstedt catalyst (at a Si—H:vinyl ratio of 1.75:1)—The curing in Example 11 was repeated with a Si—H:vinyl ratio of 1.75:1. However, the product was more fluid in nature than the one obtained in Example 11.

Example 14

Curing of product from Example 1 with the cross-linker tetrakis(dimethylsiloxy)silane using the photochemical catalyst, $Pt(acac)_2$ (homogeneous catalysis) (at a Si—H:vinyl ratio of 1.38:1)—A flame-dried quartz photochemical reaction tube was charged with 10 mg (0.0254 mmol) of $Pt(acac)_2$ under Ar in a dry box. 1 mL of $CH_2Cl_2$ was added to it to yield a pale yellow catalyst solution. In a separate vial, the product from Example 1 (0.2 g; 0.434 mmol) and tetrakis(dimethylsiloxy)silane (0.11 mL; 0.299 mmol) were stirred for two min to yield a mixture with a Si—H:vinyl ratio of 1.38:1. This mixture was syringed into the catalyst solution under argon, and the reaction tube was inserted into a Rayonet Photochemical Reaction Instrument. The sample was irradiated for 30 min using a >300 nm (Pyrex filtered) radiation while being constantly agitated by a stream of argon which was passed via needle. After this period, the irradiation was stopped and the quartz tube was taken out of the reactor. The formation of a cured gel was observed. (The reaction was essentially complete in the first 5 min). The thermal properties: Char yield at 1000° C. (in $N_2$): 81%. Char yield at 1000° C. (in air): 92%. $T_g$: −46° C. The material formed was thus found to be elastomeric and thermally and thermo-oxidatively stable.

Example 15

Curing of the product from Example 1 with the cross-linker tetrakis(dimethylsiloxy)silane using the Karstedt catalyst (at a Si—H:vinyl ratio of 1.25:1)—The curing in Example 14 was repeated with a Si—H:vinyl ratio of 1.25:1. However, the product was a harder solid than the one obtained in Example 14.

Example 16

Curing of the product from Example 1 with the cross-linker tetrakis(dimethylsiloxy)silane using the Karstedt catalyst (at Si—H:vinyl ratio of 1.6:1)—The curing in Example 14 was repeated with a Si—H:vinyl ratio of 1.6:1. However, the product was more fluid in nature than the one obtained in Example 14.

Example 17

Curing of the product from Example 1 with the cross-linker methyl tris(dimethylsiloxy)silane using the Karstedt catalyst (at a Si—H:vinyl ratio of 1.30:1)—In a reaction vial was taken 0.2 g (0.434 mmol) of product from Example 1. A 0.5 mL portion of distilled hexanes was added to the vial and the mix was thoroughly stirred using a mechanical stirrer for 2 min. Using a 500 μL syringe, a drop of the Karstedt catalyst solution was added to the mixture and was thoroughly stirred for two more minutes as before. A 0.12 mL portion of methyltris(dimethylsiloxy)silane (0.376 mmol; Si—H:vinyl ratio of 1.30:1) was added via syringe to the mixture and was stirred vigorously for 2 min. The curing was instantaneous. The fabricated films or disks were clear and were void-free. The thermal properties: Char yield at 1000° C. (in $N_2$): 48%. Char yield at 1000° C. (in air): 70%. $T_g$: −59° C. The material formed was thus found to be elastomeric and thermally and thermo-oxidatively stable.

Example 18

Curing of the product from Example 1 with the cross-linker methyl tris(dimethylsiloxy)silane using the Karstedt catalyst (at a Si—H:vinyl ratio of 0.9:1)—The curing in Example 17 was repeated with a Si—H:vinyl ratio of 0.9:1. However, the product was more fluid than the one obtained in Example 17.

Example 19

Curing of product from Example 1 with the cross-linker methyl tris(dimethylsiloxy)silane using the Karstedt catalyst (at a Si—H:vinyl ratio of 1.10:1)—The curing in Example 17 was repeated with a Si—H:vinyl ratio of 1.10:1. However, the product was a harder solid than the one obtained in Example 17.

Example 20

Curing of the product from Example I with the cross-linker phenyl tris(dimethylsiloxy)silane using the Karstedt catalyst (at a Si—H:vinyl ratio of 1.30:1)—In a reaction vial was taken 0.2 g (0.434 mmol) of product from Example 1. A 0.5 mL portion of distilled hexanes was added to the vial and the mix was thoroughly stirred using a mechanical stirrer for 2 min. Using a 500 μL syringe, a drop of the Karstedt catalyst solution was added to the mixture and was thoroughly stirred for two more minutes as before. A 0.13 mL portion of phenyltris(dimethylsiloxy)silane (0.376 mmol; Si—H:vinyl ratio of 1.30:1) was added via syringe to the mixture and was stirred vigorously for 2 min. The curing was instantaneous. The fabricated films or disks were clear and were void-free. The thermal properties: Char yield at 1000° C. (in $N_2$): 67%. Char yield at 1000° C. (in air): 76%. $T_g$: −48° C. The material formed was thus found to be elastomeric and thermally and thenno-oxidatively stable.

Example 21

Curing of the product from Example 1 with the cross-linker phenyl tris(dimethylsiloxy)silane using the Karstedt catalyst (at a Si—H:vinyl ratio of 1.25:1)—The curing in Example 20 was repeated with a Si—H:vinyl ratio of 1.25:1. However, the product was a harder solid than the one obtained in Example 20.

Example 22

Curing of the product from Example 1 with the cross-linker phenyl tris(dimethylsiloxy)silane using the Karstedt catalyst (at a Si—H:vinyl ratio of 1.50:1)—The curing in Example 20 was repeated with a Si—H:vinyl ratio of 1.50:1. However, the product was more fluid than the one obtained in Example 20.

Example 23

Curing of the product from Example 3 with the cross-linker tetrakis(dimethylsiloxy)silane using the Karstedt catalyst (at a Si—H:vinyl ratio of 1.25:1)—In a reaction vial was taken 0.235 g (0.208 mmol) of product from Example 3. A 0.5 mL portion of distilled hexanes was added to the vial and the mix was thoroughly stirred using a mechanical stirrer for 2 min. Using a 500 μL syringe, a drop of the Karstedt catalyst solution was added to the mixture and was thoroughly stirred for two more minutes as before. A 0.05 mL portion of tetrakis (dimethylsiloxy)silane (0.1296 mmol; Si—H:vinyl ratio of 1.25:1) was added via syringe to the mixture and was stirred vigorously for 2 min. The curing was instantaneous. The fabricated films or disks were clear and were void-free. The thermal properties: Char yield at 1 000° C. (in $N_2$): 51%. Char yield at 1000° C. (in air): 71%. $T_g$: below −70° C. The material formed was thus found to be elastomeric and thermally and thermo-oxidatively stable.

Example 24

Curing of the product from Example 4 with the cross-linker tetrakis(dimethylsiloxy)silane using the Karstedt catalyst (at a Si—H:vinyl ratio of 1.25:1)—In a reaction vial was taken 0.25 g (0.207 mmol) of product from Example 4. A 0.5 mL portion of distilled hexanes was added to the vial and the mix was thoroughly stirred using a mechanical stirrer for 2 min. Using a 500 μL syringe, a drop of the Karstedt catalyst solution was added to the mixture and was thoroughly stirred for two more minutes as before. A 0.05 mL portion of tetrakis (dimethylsiloxy)silane (0.1296 mmol; Si—H:vinyl ratio of 1.25:1) was added via syringe to the mixture and was stirred vigorously for 2 min. The curing was instantaneous. The fabricated films or disks were clear and were void-free. The thermal properties: Char yield at 1000° C. (in $N_2$): 50%. Char yield at 1000° C. (in air): 65%. $T_g$: below −70° C. The material formed was thus found to be elastomeric and thermally and thermo-oxidatively stable.

Example 25

Curing of the product from Example 2 with the cross-linker tetrakis(dimethylsiloxy)silane using the Karstedt catalyst (enough to react one of the triple bonds of the ethynyl bond) in hexane—In a reaction vial was taken 0.2 g (0.438 mmol) of product from Example 2. A 0.5 mL portion of distilled hexanes was added to the vial and the mix was thoroughly stirred using a mechanical stirrer for 2 min. Using a 500 μL syringe, a drop of the Karstedt catalyst solution was added to the mixture and was thoroughly stirred for two more minutes as before. A 0.1 mL portion of tetrakis(dimethylsiloxy)silane (0.2715 mmol, Si—H:ethynyl ratio of 1.25:1) was added via syringe to the mixture and was stirred vigorously for 2 min. The curing was instantaneous. The fabricated films or disks were clear and were void-free. The thermal properties: Char yield at 1000° C. (in $N_2$): 81%. Char yield at 1000° C. (in air): 88%. $T_g$: −28° C. The material formed was thus found to be elastomeric and thermally and thermo-oxidatively stable.

Example 26

Curing of the product from Example 2 with the cross-linker tetrakis(dimethylsiloxy)silane using the Karstedt catalyst (enough to react one of the triple bonds of the ethynyl bond) in water—In a reaction vial was taken 0.2 g (0.438 mmol) of product from Example 2. A 0.5 mL portion of distilled water was added to the vial and the mix was thoroughly stirred using a mechanical stirrer for 2 min. Using a 500 μL syringe, a drop of the Karstedt catalyst solution was added to the mixture and was thoroughly stirred for two more minutes as before. A 0.11 mL portion of tetrakis(dimethylsiloxy)silane (0.2715 mmol, Si—H:ethynyl ratio of 1.25:1) was added via syringe to the mixture and was stirred vigorously for 2 min. The curing was instantaneous. The fabricated films or disks were clear and were void-free. The thermal properties: Char yield at 1000° C. (in $N_2$): 81%. Char yield at 1000° C. (in air): 88%. $T_g$: −28° C. The material formed was thus found to be elastomeric and thermally and thermo-oxidatively stable.

Example 27

Curing of the product from Example 2 with the cross-linker methyl tris(dimethylsiloxy)silane using the Karstedt catalyst (enough to react one of the triple bonds of the ethynyl bond) in hexane—In a reaction vial was taken 0.2 g (0.438 mmol) of product from Example 2. A 0.5 mL portion of hexane was added to the vial and the mix was thoroughly stirred using a mechanical stirrer for 2 min. Using a 500 μL syringe, a drop of the Karstedt catalyst solution was added to the mixture and was thoroughly stirred for two more minutes as before. A 0.12 mL portion of methyltris(dimethylsiloxyl)silane (0.2715 mmol, Si—H:ethynyl ratio of 1.25:1) was added via syringe to the mixture and was stirred vigorously for 2 min. The curing was instantaneous. The cured product was extracted into diethyl ether. The fabricated films or disks were clear and were void-free. The thermal properties: Char yield at 1000° C. (in $N_2$): 70%. Char yield at 1000° C. (in air): 82%. $T_g$: −37° C. The material formed was thus found to be elastomeric and thermally and thermo-oxidatively stable.

Example 28

Curing of the product from Example 2 with the cross-linker phenyl tris(dimethylsiloxy)silane using the Karstedt catalyst (enough to react one of the triple bonds of the ethynyl bond) in hexane—In a reaction vial was taken 0.2 g (0.438 mmol) of product from Example 2. A 0.5 mL portion of hexane was added to the vial and the mix was thoroughly stirred using a mechanical stirrer for 2 min. Using a 500 μL syringe, a drop of the Karstedt catalyst solution was added to the mixture and was thoroughly stirred for two more minutes as before. A 0.13 mL portion of phenyltris(dimethylsiloxyl)silane (0.2715 mmol, Si—H:ethynyl ratio of 1.25:1) was added via syringe to the mixture and was stirred vigorously for 2 min. The curing was instantaneous. The cured product was extracted into diethyl ether. The fabricated films or disks were clear and were void-free. The thermal properties: Char yield at 1000° C. (in $N_2$): 78%. Char yield at 1000° C. (in air): 83%. $T_g$: −36° C. The material formed was thus found to be elastomeric and thernmally and thermo-oxidatively stable.

Example 29

Curing of the product from Example 2 with the cross-linker tetrakis(dimethylsiloxy)silane using the Karstedt catalyst (enough to react both the triple bonds of the ethynyl bond) in hexane—In a reaction vial was added 0.2 g (0.438 mmol) of product from Example 2. A 0.5 mL portion of distilled hexanes was added to the vial and the mix was thoroughly stirred using a mechanical stirrer for 2 min. Using a 500 μL syringe, a drop of the Karstedt catalyst solution was added to the mixture and was thoroughly stirred for two more minutes as before. A 0.22 mL portion of tetrakis(dimethylsiloxy)silane (0.543 mmol, Si—H:ethynyl ratio of 1.25:1) was added via syringe to the mixture and was stirred vigorously for 2 min. The curing was instantaneous. The fabricated films or the disks were clear and were void-free. The thermal properties: Char yield at 1000° C. (in $N_2$): 72%. Char yield at 1000° C. (in air): 85%. $T_g$: −6.0° C. with minor transitions at 13.87° C. and 56.11° C. The material formed was thus found to be elastomeric and thermally and thermo-oxidatively stable.

Example 30

Curing of the product from Example 2 with the cross-linker methyl tris(dimethylsiloxy)silane using the Karstedt catalyst (enough to react both the triple bonds of the ethynyl bond) in hexane—In a reaction vial was added 0.2 g (0.438 mmol) of product from Example 2. A 0.5 mL portion of distilled hexanes was added to the vial and the mix was thoroughly stirred using a mechanical stirrer for 2 min. Using a 500 µL syringe, a drop of the Karstedt catalyst solution was added to the mixture and was thoroughly stirred for two more minutes as before. A 0.24 mL portion of methyltris(dimethylsiloxy)silane (0.543 mmol, Si—H:ethynyl ratio of 1.25:1) was added via syringe to the mixture and was stirred vigorously for 2 min. The curing was instantaneous. The fabricated films or the disks were clear and were void-free. The thermal properties: Char yield at 1000° C. (in $N_2$): 42%. Char yield at 1000° C. (in air): 77%. $T_g$: −23.0° C. with minor transitions at 13.87° C. and 56.11° C. The material formed was thus found to be elastomeric and thermally and thermo-oxidatively stable.

Example 31

Curing of the product from Example 2 with the cross-linker phenyl tris(dimethylsiloxy)silane using the Karstedt catalyst (enough to react both the triple bonds of the ethynyl bond) in hexane—In a reaction vial was added 0.2 g (0.438 mmol) of product from Example 2. A 0.5 mL portion of distilled hexanes was added to the vial and the mix was thoroughly stirred using a mechanical stirrer for 2 min. Using a 500 µL syringe, a drop of the Karstedt catalyst solution was added to the mixture and was thoroughly stirred for two more minutes as before. A 0.26 mL portion of phenyltris(dimethylsiloxy)silane (0.543 mmol, Si—H:ethynyl ratio of 1.25:1) was added via syringe to the mixture and was stirred vigorously for 2 min. The curing was instantaneous. The fabricated films or the disks were clear and were void-free. The thermal properties: Char yield at 1000° C. (in $N_2$): 56%. Char yield at 1000° C. (in air): 80%. $T_g$: −21.0° C. with minor transitions at 13.87° C. and 56.11° C. The material formed was thus found to be elastomeric and thermally and thermo-oxidatively stable.

Example 32

Curing of the product from Example 6 with the cross-linker tetrakis(dimethylsiloxy)silane using the Karstedt catalyst (enough to react both the triple bonds of the ethynyl bond) in hexane—In a reaction vial was added 0.26 g (0.22 mmol) of product from Example 6. A 0.5 mL portion of distilled hexanes was added to the vial and the mix was thoroughly stirred using a mechanical stirrer for 2 min. Using a 500 µL syringe, a drop of the Karstedt catalyst solution was added to the mixture and was thoroughly stirred for two more minutes as before. A 0.05 mL portion of tetrakis(dimethylsiloxy)silane (0.14 mmol; Si—H:vinyl ratio of 1.25:1) was added via syringe to the mixture and was stirred vigorously for 2 min. The curing was instantaneous. The fabricated films or the disks were clear and were void-free. The thermal properties: Char yield at 1000° C. (in $N_2$): 68%. Char yield at 1000° C. (in air): 82%. $T_g$: −52.52° C. and minor transitions at 17.42° C. and 41.88° C. The material formed was thus found to be elastomeric and thermally and thermo-oxidatively stable.

Example 33

Curing of the product from Example 10 with the cross-linker tetrakis(dimethylsiloxy)silane using the Karstedt catalyst in hexane—In a reaction vial was added 0.32 g of product from Example 10. A 0.5 mL portion of distilled hexanes was added to the vial and the mix was thoroughly stirred using a mechanical stirrer for 2 min. Using a 500 µL syringe, a drop of the Karstedt catalyst solution was added to the mixture and was thoroughly stirred for two more minutes as before. A 0.05 mL portion of tetrakis(dimethylsiloxy)silane was added via syringe to the mixture and was stirred vigorously for 2 min. The curing was instantaneous. The fabricated films or be left in the vial to evaporate off the volatiles to form a disk. The films or the disks formed were clear and were void-free. The thermal properties: Char yield at 1000° C. (in $N_2$): 49%. Char yield at 1000° C. (in air): 75%. $T_g$: −56.16° C. and a minor transition at 13.31° C. The material formed was thus found to be elastomeric and thermally and thermo-oxidatively stable.

Example 34

Curing of the product from Example 2 with the cross-linker tetrakis(dimethylsiloxy)silane using the photochemical catalyst, Pt(acac)$_2$ (enough to react one of the triple bonds of the ethynyl bond) in hexane—A flame-dried quartz photochemical reaction tube was charged with 10 mg (0.0254 mmol) of Pt(acac)$_2$ under Ar in a dry box. 1 mL of $CH_2Cl_2$ was added to it to yield a pale yellow catalyst solution. In a separate vial, the product from Example 2 (0.2 g; 0.438 mmol) and tetrakis(dimethylsiloxy)silane (0.1 mL; 0.274 mmol) were stirred for two minutes to yield a mix with a Si—H:ethynyl ratio of 1.25:1. This mix was syringed into the catalyst solution under argon, and the reaction tube was inserted into a Rayonet Photochemical reaction instrument. The sample was irradiated for 30 min using a >300 nm (Pyrex filtered) radiation while being constantly agitated by a stream of argon which was passed via needle. After this period, the irradiation was stopped and the quartz tube was taken out of the reactor. The formation of a cured gel was observed. The thermal properties: Char yield at 1000° C. (in $N_2$): 78%. Char yield at 1000° C. (in air): 90%. $T_g$: −32° C. The material formed was thus found to be elastomeric and thermally and thermo-oxidatively stable.

Example 35

Curing of the product Example 2 with the cross-linker tetrakis(dimethylsiloxy)silane using the $Rh_2(COD)_2(\mu\text{-}Cl)_2$ catalyst (enough to react one of the triple bonds of the ethynyl bond) in toluene—A flame-dried 50 mL Schlenk flask was charged with 10 mg (0.0201 mmol) of $Rh_2(COD)_2(\mu\text{-}Cl)_2$ under argon in a dry box. A 2 mL solution of 0.2 g of product from Example 2 (0.438 mmol) in anhydrous toluene was prepared in another flame-dried flask. This solution was transferred via cannula into the flask containing the catalyst. Using a 500 µL syringe, 0.1 mL of tetrakis(dimethylsiloxy)silane (0.274 mmol) was syringed into the mixture and it was introduced into an oil bath at 70° C. The reaction was instantaneous as evidenced by the darkening of the color of the mixture. The mixture was stirred for 30 min at this temperature and then the volatiles were removed with vacuum. A cured gel resulted. The thermal properties: Char yield at 1000° C. (in $N_2$): 75%. Char yield at 1000° C. (in air): 88%. $T_g$: −33° C. The material formed was thus found to be elastomeric and thermally and therno-oxidatively stable.

Example 36

Curing of the product from Example 1 with the cross-linker tetrakis(dimethylsiloxy)silane using the chloroplatinic acid catalyst, $H_2PtCl_6.6H_2O$ (heterogeneous catalysis)—In a reaction vial was added 0.2 g (0.434 mmol) of product from Example 1. A 0.08 mL portion of tetrakis(dimethylsiloxy)silane (0.217 mmol, Si—H:vinyl ratio of 1:1) was added via syringe to the mixture and was stirred vigorously using a mechanical stirrer for 2 minutes. A drop of a 0.05 M $H_2PtCl_6.6H_2O$ catalyst solution (prepared by dissolving 0.13 g of the catalyst in 5 mL THF) was added to the mixture using a 500 µL syringe. The mixture was stirred vigorously using a mechanical stirrer for 2 minutes. After 40 hr, the contents of the flask were heated at 100° C. for 2 hr on a hot plate. A gel was observed to form. The films or the disks formed were clear and were void-free. The thermal properties: Char yield at 1000° C. (in $N_2$): 60%. Char yield at 1000° C. (in air): 78%. $T_g$: −39° C. The duration for the reaction is much longer than that observed with the Karstedt catalyst or the $Pt(acac)_2$ catalyst. The material formed was thus found to be elastomeric and thermally and thermo-oxidatively stable.

Example 37

Curing of the product from Example 1 with the cross-linker tetrakis(dimethylsiloxy)silane using the chloroplatinic acid catalyst, $H_2PtCl_6.6H_2O$ (at a Si—H:vinyl ratio of 0.75:1)— The curing in Example 36 was repeated with a Si—H:vinyl ratio of 0.75:1. However, the product was more fluid than the one obtained in Example 36.

Example 38

Curing of Example 1 product with the cross-linker tetrakis (dimethylsiloxy)silane using the chloroplatinic acid catalyst, $H_2PtCl_6.6H_2O$ (at a Si—H:vinyl ratio of 0.5:1)—The curing in Example 36 was repeated with a Si—H:vinyl ratio of 0.5:1. However, the product was more fluid than the one obtained in Example 36.

Example 39

Curing of the product from Example 1 with a 1:1 mixture of cross-linkers tetrakis(dimethylsiloxy)silane and methyltris (dimethylsiloxy)silane using the Karstedt catalyst (at a Si—H:vinyl ratio of 1.3:1)—In a reaction vial was added 0.2 g (0.434 mmol) of product from Example 1. A 0.5 mL portion of distilled hexanes was added to the vial and the mix was thoroughly stirred using a mechanical stirrer for 2 min. Using a 500 µL syringe, a drop of the Karstedt catalyst solution was added to the mixture and was thoroughly stirred for two more minutes as before. A mixture of 0.05 mL portion of tetrakis (dimethylsiloxy)silane and 0.075 mL methyltris(dimethylsiloxy)silane (Si—H:vinyl ratio of 1.3:1) was added via syringe to the mixture and was stirred vigorously for 2 min. The curing was instantaneous. The thermal properties: Char yield at 1000° C. (in $N_2$): 68%. Char yield at 1000° C. (in air): 80%. $T_g$: below −70° C. The material formed was thus found to be elastomeric and thermally and thermo-oxidatively stable.

Example 40

Curing of the product from Example 1 with a 1:1 mixture of cross-linkers tetrakis(dimethylsiloxy)silane and phenyltris (dimethylsiloxy)silane using the Karstedt catalyst (at a Si—H:vinyl ratio of 1.3:1)—In a reaction vial was added 0.2 g (0.434 mmol) of product from Example 1. A 0.5 mL portion of distilled hexanes was added to the vial and the mix was thoroughly stirred using a mechanical stirrer for 2 min. Using a 500 µL syringe, a drop of the Karstedt catalyst solution was added to the mixture and was thoroughly stirred for two more minutes as before. A mixture of 0.05 mL portion of tetrakis (dimethylsiloxy)silane and 0.085 mL phenyltris(dimethylsiloxy)silane (Si—H:vinyl ratio of 1.3:1) was added via syringe to the mixture and was stirred vigorously for 2 min. The curing was instantaneous. The thermal properties: Char yield at 1000° C. (in $N_2$): 72%. Char yield at 1000° C. (in air): 85%. Glass transition temperature: below −55° C. The material formed was thus found to be elastomeric and thermally and thermo-oxidatively stable.

Example 41

Curing of the product from Example 3 with a 1:1 mixture of cross-linkers tetrakis(dimethylsiloxy)silane and methyltris (dimethylsiloxy)silane using the Karstedt catalyst (at a Si—H:vinyl ratio of 1.3:1)—In a reaction vial was added 0.235 g (0.208 mmol) of product from Example 3. A 0.5 mL portion of distilled hexanes was added to the vial and the mix was thoroughly stirred using a mechanical stirrer for 2 min. Using a 500 µL syringe, a drop of the Karstedt catalyst solution was added to the mixture and was thoroughly stirred for two more minutes as before. A mixture of 0.025 mL portion of tetrakis(dimethylsiloxy)silane and 0.038 mL methyltris(dimethylsiloxy)silane (Si—H:vinyl ratio of 1.3:1) was added via syringe to the mixture and was stirred vigorously for 2 min. The curing was instantaneous. The thermal properties: Char yield at 1000° C. (in $N_2$): 48%. Char yield at 1000° C. (in air): 68%. $T_g$: below −70° C. The material formed was thus found to be elastomeric and thermally and thermo-oxidatively stable.

Example 42

Curing of the product from Example 3 with a 1:1 mixture of cross-linkers tetrakis(dimethylsiloxy)silane and phenyltris (dimethylsiloxy)silane using the Karstedt catalyst (at a Si—H:vinyl ratio of 1.3:1)—In a reaction vial was added 0.235 g (0.208 mmol) of product from Example 3. A 0.5 mL portion of distilled hexanes was added to the vial and the mix was thoroughly stirred using a mechanical stirrer for 2 min. Using a 500 µL syringe, a drop of the Karstedt catalyst solution was added to the mixture and was thoroughly stirred for two more minutes as before. A mixture of 0.025 mL portion of tetrakis(dimethylsiloxy)silane and 0.043 mL phenyltris(dimethylsiloxy)silane (Si—H:vinyl ratio of 1.3:1) was added via syringe to the mixture and was stirred vigorously for 2 min. The curing was instantaneous. The thermal properties: Char yield at 1000° C. (in $N_2$): 47%. Char yield at 1000° C. (in air): 65%. $T_g$: below −70° C. The material formed was thus found to be elastomeric and thermally and thermo-oxidatively stable.

Example 43

Curing of the product from Example 4 with a 1:1 mixture of cross-linkers tetrakis(dimethylsiloxy)silane and methyltris (dimethylsiloxy)silane using the Karstedt catalyst (at a Si—H:vinyl ratio of 1.3:1)—In a reaction vial was added 0.25 g (0.207 mmol) of product from Example 4. A 0.5 mL portion of distilled hexanes was added to the vial and the mix was thoroughly stirred using a mechanical stirrer for 2 minutes. Using a 500 µL syringe, a drop of the Karstedt hydrosilation catalyst solution was added to the mixture and was thoroughly stirred for two more minutes as before. A mixture of 0.025 mL portion of tetrakis(dimethylsiloxy)silane and 0.038 mL methyltris(dimethylsiloxy)silane (Si—H:vinyl ratio of 1.3:1) was added via syringe to the mixture and was stirred vigorously for 2 min. The citing was instantaneous. The thermal properties: Char yield at 1000° C. (in $N_2$): 47%. Char yield at 1000° C. (in air): 66%. $T_g$: below −70° C. The material formed was thus found to be elastomeric and thermally and thermo-oxidatively stable.

Example 44

Curing of the product from Example 4 with a 1:1 mixture of cross-linkers tetrakis(dimethylsiloxy)silane and phenyltris (dimethylsiloxy)silane using the Karstedt catalyst (at a Si—H:vinyl ratio of 1.3:1)—In a reaction vial was added 0.25 g (0.207 mmol) of product from Example 4. A 0.5 mL portion of distilled hexanes was added to the vial and the mix was thoroughly stirred using a mechanical stirrer for 2 min. Using a 500 μL syringe, a drop of the Karstedt catalyst solution was added to the mixture and was thoroughly stirred for two more minutes as before. A mixture of 0.025 mL portion of tetrakis (dimethylsiloxy)silane and 0.043 mL phenyltris(dimethylsiloxy)silane (Si—H:vinyl ratio of 1.3:1) was added via syringe to the mixture and was stirred vigorously for 2 min. The curing was instantaneous. The thermal properties: Char yield at 1000° C. (in $N_2$): 46%. Char yield at 1000° C. (in air): 62%. $T_g$: below −70° C. The material formed was thus found to be elastomeric and thermally and thermo-oxidatively stable.

Example 45

Curing of the product from Example 2 with a 1:1 mixture of cross-linkers tetrakis(dimethylsiloxy)silane and methyltris (dimethylsiloxy)silane using the Karstedt catalyst (at a Si—H:vinyl ratio of 1.3:1)—In a reaction vial was added 0.2 g (0.438 mmol) of product from Example 2. A 0.5 mL portion of distilled hexanes was added to the vial and the mix was thoroughly stirred using a mechanical stirrer for 2 min. Using a 500 μL syringe, a drop of the Karstedt catalyst solution was added to the mixture and was thoroughly stirred for two more minutes as before. A mixture of 0.05 mL portion of tetrakis (dimethylsiloxy)silane and 0.075 mL methyltris(dimethylsiloxy)silane (Si—H:vinyl ratio of 1.3:1) was added via syringe to the mixture and was stirred vigorously for 2 min. The curing was instantaneous. The thermal properties: Char yield at 1000° C. (in $N_2$): 75%. Char yield at 1000° C. (in air): 88%. $T_g$: below −50° C. The material formed was thus found to be elastomeric and thermally and thermo-oxidatively stable.

Example 46

Curing of the product from Example 2 with a 1:1 mixture of cross-linkers tetrakis(dimethylsiloxy)silane and phenyltris (dimethylsiloxy)silane using the Karstedt catalyst (at a Si—H:vinyl ratio of 1.3:1)—In a reaction vial was added 0.2 g (0.438 mmol) of product from Example 2. A 0.5 mL portion of distilled hexanes was added to the vial and the mix was thoroughly stirred using a mechanical stirrer for 2 min. Using a 500 μL syringe, a drop of the Karstedt catalyst solution was added to the mixture and was thoroughly stirred for two more minutes as before. A mixture of 0.05 mL portion of tetrakis (dimethylsiloxy)silane and 0.085 mL phenyltris(dimethylsiloxy)silane (Si—H:vinyl ratio of 1.3:1) was added via syringe to the mixture and was stirred vigorously for 2 min. The curing was instantaneous. The thermal properties: Char yield at 1000° C. (in $N_2$): 78%. Char yield at 1000° C. (in air): 90%. $T_g$: below −30° C. The material formed was thus found to be elastomeric and thermally and thermo-oxidatively stable.

Example 47

Curing of the product from Example 6 with a 1:1 mixture of cross-linkers tetrakis(dimethylsiloxy)silane and methyltris (dimethylsiloxy)silane using the Karstedt catalyst (at a Si—H:vinyl ratio of 1.3:1)—In a reaction vial was added 0.26 g (0.22 mmol) of product from Example 6. A 0.5 mL portion of distilled hexanes was added to the vial and the mix was thoroughly stirred using a mechanical stirrer for 2 min. Using a 500 μL syringe, a drop of the Karstedt catalyst solution was added to the mixture and was thoroughly stirred for two more minutes as before. A mixture of 0.025 mL portion of tetrakis (dimethylsiloxy)silane and 0.038 mL methyltris(dimethylsiloxy)silane (Si—H:vinyl ratio of 1.3:1) was added via syringe to the mixture and was stirred vigorously for 2 min. The curing was instantaneous. The thermal properties: Char yield at 1000° C. (in $N_2$): 62%. Char yield at 1000° C. (in air): 88%. $T_g$: below −70° C. The material formed was thus found to be elastomeric and thermally and thermo-oxidatively stable.

Example 48

Curing of the product from Example 10 with a 1:1 mixture of cross-linkers tetrakis(dimethylsiloxy)silane and methyltris (dimethylsiloxy)silane using the Karstedt catalyst (at a Si—H:vinyl ratio of 1.3:1)—In a reaction vial was added 0.32 g of product from Example 10. A 0.5 mL portion of distilled hexanes was added to the vial and the mix was thoroughly stirred using a mechanical stirrer for 2 min. Using a 500 μL syringe, a drop of the Karstedt hydrosilation catalyst solution was added to the mixture and was thoroughly stirred for two more minutes as before. A mixture of 0.025 mL portion of tetrakis(dimethylsiloxy)silane and 0.038 mL methyltris(dimethylsiloxy)silane (Si—H:vinyl ratio of 1.3:1) was added via syringe to the mixture and was stirred vigorously for 2 min. The curing was instantaneous. The thermal properties: Char yield at 1000° C. (in $N_2$): 45%. Char yield at 1000° C. (in air): 60%. $T_g$: below −70° C. The material formed was thus found to be elastomeric and thermally and thermo-oxidatively stable.

Coating Studies

Example 49

Application of the product from Example 11 as a thermo-oxidative barrier coating for the high performance fiber Zylon—1 g (2.17 mmol) of product from Example 1 and 0.55 mL (1.49 mmol) of tetrakis(dimethylsiloxy)silane were taken in a 1½ inches X½ inch vial and were mixed vigorously using a mechanical stirrer for 2 min. 1 mL of hexane was added to it and the mixture was further mechanically stirred for 2 min. The procedure was repeated after addition of 2 drops of a 2000 ppm Pt Karstedt catalyst solution in xylene using a 500 μL gas-tight syringe (The 2000 ppm Karstedt catalyst solution was obtained by diluting 0.5 mL of a 2.1-2.4% Pt concentration Karstedt catalyst solution in xylene obtained from Gelest, Inc. to 5 mL with distilled xylene in a side arm Schlenk tube under argon). Further drops of the catalyst were added in the following progression and the mixture was stirred well after each addition using a mechanical stirrer. The $3^{rd}$ drop was added after 3 min, the $4^{th}$ at the $4^{th}$ min, $5^{th}$ at $6^{th}$, $6^{th}$ at $8^{th}$, $7^{th}$ at $10^{th}$, $8^{th}$ at $13^{th}$, $9^{th}$ at $15^{th}$ and the $10^{th}$ and final drop at the $18^{th}$ min. By the $5^{th}$ drop the vial had become warmer due to the exothermic nature of the hydrosilation reaction. A visible increase in the viscosity of the mixture and the appearance of a yellow color were also observed. After the addition of the $10^{th}$ drop, the mixture was stirred on the stirrer for 7 more min. At this time, an inch long Zylon fiber was dropped into the mixture and was left in for about 7 min to obtain a coating of the in situ-formed Example 11 product. Then the fiber was taken out and was cured at 300° C. in $N_2$ for 3 hr. The thermo-oxidative stability of the fiber was determined from its thermogram obtained to 1000° C. in air in a TGA instrument at a flow rate of 100 cc/min. The percentage weight retention of the coated fiber was 77%. This represents a dramatic improvement over the percentage weight retention of the uncoated Zylon fiber, which is 8%.

Example 50

Application of the product from Example 7 as a thermo-oxidative barrier coating for the high performance fiber Zylon—1 g (2.17 mmol) of product from Example 1 and 0.55 mL (2.604 mmol) of 1,1,3,3,5,5-hexamethyltrisiloxane were taken in a 1½ inches X½ inch vial and were mixed vigorously using a mechanical stirrer for 2 min. 1 mL of hexane was added to it and the mixture was further mechanically stirred for 2 min. The procedure was repeated after addition of 2 drops of a 2000 ppm Pt Karstedt catalyst solution in xylene using a 500 μL gas-tight syringe. Addition of further drops and coating of the fiber were as made as in Example 45. The coated fiber was cured at 300° C. in $N_2$ for 3 hr and its thermo-oxidative stability was determined. The percentage weight retention of the coated fiber was 67%.

Example 51

Application of the product from Example 8 as a thermo-oxidative barrier coating for the high performance fiber Zylon—1 g (2.17 mmol) of product from Example 1 and 0.71 mL (2.604 mmol) of 1,1,3,3,5,5,7,7-octamethyltetrasiloxane were taken in a 1½ inches X½ inch vial and were mixed vigorously using a mechanical stirrer for 2 min. 1 mL of hexane was added to it and the mixture was further mechanically stirred for 2 min. The procedure was repeated after addition of 2 drops of a 2000 ppm Pt Karstedt catalyst solution in xylene using a 500 μL gas-tight syringe. Addition of further drops and coating of the fiber were as made as in Example 45. The coated fiber was cured at 300° C. in $N_2$ for 3 hr and its thermo-oxidative stability was determined. The percentage weight retention of the coated fiber was 65%.

Example 52

Application of the product from Example 24 as a thermo-oxidative barrier coating of the high performance fiber Zylon—1 g (2.17 mmol) of product from Example 1 and 0.35 mL (1.085 mmol) of 1,1,3,3,5,5,7,7-octamethyltetrasiloxane were taken in a 1½ inches X½ inch vial and were mixed vigorously stirred using a mechanical stirrer for 2 min. Using a 500 μL syringe, two drops of a 2000 ppm Pt Karstedt catalyst solution was added to the mixture and was thoroughly stirred for two more minutes as before. A 0.05 mL portion of tetrakis(dimethylsiloxy)silane (0.1296 mmol; Si—H:vinyl ratio of 1.25:1) was added via syringe to the mixture and was stirred vigorously for 2 min. Addition of further drops and coating of the fiber were made as in Example 45. The coated Zylon fiber was cured at 300° C. in $N_2$ for 3 hr and its thermo-oxidative stability was determined. The percentage weight retention of the coated fiber was 69%.

Example 53

Application of the product from Example 11 as a thermo-oxidative barrier coating of the high performance fiber Kevlar—1 g (2.17 mmol) of product from Example 1 and 0.55 mL (1.49 mmol) of tetrakis(dimethylsiloxy)silane were taken in a 1½ inches X½ inch vial and were mixed vigorously using a mechanical stirrer for 2 min. 1 mL of hexane was added to it and the mixture was further mechanically stirred for 2 min. The procedure was repeated after addition of 2 drops of a 2000 ppm Pt Karstedt catalyst solution in xylene using a 500 μL gas-tight syringe. Addition of further drops and coating of the fiber were as made as in Example 45. The coated Kevlar fiber was cured at 300° C. in $N_2$ for 3 hr and its thermo-oxidative stability was determined. The percentage weight retention of the coated fiber was 72%. This represents a dramatic improvement over the percentage weight retention of the uncoated Kevlar fiber, which is 6%.

Example 54

Application of the product from Example 25 as a thermo-oxidative barrier coating of the high performance fiber Zylon—In a 1½ inches X½ inch vial was taken 0.2 g (0.438 mmol) of product from Example 2. A 0.5 mL portion of distilled hexanes was added to the vial and the mix was thoroughly stirred using a mechanical stirrer for 2 min. Using a 500 μL syringe, two drops of a 2000 ppm Pt Karstedt catalyst solution was added to the mixture and was thoroughly stirred for two more minutes as before. A 0.1 mL portion of tetrakis(dimethylsiloxy)silane (0.2715 mmol; Si—H:ethynyl ratio of 1.25:1) was added via syringe to the mixture and was stirred vigorously for 2 min. Addition of further drops and coating of the fiber were made as in Example 45. The coated Zylon fiber was cured at 300° C. in $N_2$ for 3 hr and its thermo-oxidative stability was determined. The percentage weight retention of the coated fiber is 80%.

Example 55

Application of the product from Example 28 as a thermo-oxidative barrier coating of the high performance fiber Zylon—In a 1½ inches X½ inch vial was taken 0.26 g (0.22 mmol) of product from Example 8. A 0.5 mL portion of distilled hexanes was added to the vial and the mix was thoroughly stirred using a mechanical stirrer for 2 min. Using a 500 μL syringe, two drops of a 2000 ppm Pt Karstedt catalyst solution was added to the mixture and was thoroughly stirred for two more minutes as before. A 0.05 mL portion of tetrakis(dimethylsiloxy)silane (0.14 mmol; Si—H:vinyl ratio of 1.25:1) was added via syringe to the mixture and was stirred vigorously for 2 min. Addition of further drops and coating of the fiber were made as in Example 45. The coated Zylon fiber was cured at 300° C. in $N_2$ for 3 hr and its thermo-oxidative stability was determined. The percentage weight retention of the coated fiber is 72%.

Example 56

Application of the product from Example 29 as a thermo-oxidative barrier coating of the high performance fiber Zylon—In a 1½ inches×½ inch vial was taken 0.32 g of product of Example 10. A 0.5 mL portion of distilled hexanes was added to the vial and the mix was thoroughly stirred using a mechanical stirrer for 2 min. Using a 500 μL syringe, two drops of a 2000 ppm Pt Karstedt catalyst solution was added to the mixture and was thoroughly stirred for two more minutes as before. A 0.05 mL portion of tetrakis(dimethylsiloxy) silane was added via syringe to the mixture and was stirred vigorously for 2 min. Addition of further drops and coating of the fiber were made as in Example 45. The coated Zylon fiber was cured at 300° C. in $N_2$ for 3 hr and its thermo-oxidative stability was determined. The percentage weight retention of the coated fiber is 67%.

Conductive Properties

Example 57

Dielectric constants ($\in'$) of the network polymers—Initial measurements of the dielectric constants of the products from Example 7, Example 8, Example 11, Example 17, and Example 20 were conducted on their sample films made in circular Teflon molds of dimension 18 mm (diameter)×1 mm (thickness). The measurements were made on an Alpha analyzer of Novo Control dielectric measurements instrument and the $\in'$ (dielectric permittivity) was calculated by the expression $\in^* = \in' - \in''$. The frequencies used for the measurements ranged from $10^1$ to $10^6$ Hz.

TABLE 1

| Example | ε' |
| --- | --- |
| 7 | 0.26 |
| 8 | 0.48 |
| 11 | 0.52 |
| 17 | 0.47 |
| 20 | 0.27 |

Example 58

Further extensive dielectric measurements and conductivity studies performed on the films of Example 11 and Example 17—The measurement films of Example 11 and Example 17 were made in circular Teflon molds of dimension 50 mm (diameter)×1 mm (thickness). The samples were made by vigorously mixing 1.2 g each of product from Example 1 with 0.6 mL of tetrakis(dimethylsiloxy)silane or 0.67 mL of methyltris(dimethylsiloxy)silane, respectively, in a mechanical stirrer with a volume of 0.5 mL of hexanes. The hydrosilation was completed by adding a drop of a 2000 ppm Pt Karstedt catalyst solution using a 500 μL syringe followed by vigorous mixing. The cured samples were transferred onto the Teflon molds wherein they formed uniform films that were used for measurements. Conductivity data were obtained by HP Megger and TDDS instruments (value in parentheses) by the Electrical Insulation Research Institute at the University of Connecticut, Storrs. Measurements were made on the films as received and also after drying them in a vacuum oven for 20 hr.

TABLE 2

| Example | as received | after 60° C. in vacuum oven for 20 hr | dielectric constant |
| --- | --- | --- | --- |
| 11 | 420 pS/m (316) | 305 pS/m (330) | 4-5 |
| 17 | 2400 pS/m (3300) | 1700 pS/m (1800) | 8 |

The conductivity values were found to be about 6-7 orders magnitude greater than a typical insulator such as XLPE (linear polyethylene). This suggested that either the material is some form of a protonic conductor or has a very high ion content with a high ion mobility. The absence of a proton source in the materials, thus, implies that the origin of the conductivity in the materials may be due to residual catalyst Pt metal ions in them.

Example 59

Conductivity measurements on a film of Example 11 formed by a 2000 ppm Karstedt catalyst solution to test for the effect of metal (Pt) concentration on the conductivity of Example 11—The same protocol as in Example 54 was followed for casting the film, except that a 2000 ppm Karstedt catalyst solution was used. The conductivity was 350 pS/m (315). The conductivity had reduced from 420 pS/m (for the film cast with a 2000 ppm Pt Karstedt catalyst solution) to 350 pS/m in the film cast with a 2000 ppm Karstedt catalyst solution. A reduction was observed in the conductivity, however, it was not significant.

Example 60

Dielectric measurements on films of hydrosilated products containing no carborane moieties—Measurements were made on hydrosilated film versions of Example 11 of that did not contain carboranes. This was done in order to study the effect of carboranes in the conductivity of the product from Example 11. The films were made as follows.

Sample A: 1.0 g of 1,3-divinyltetramethyldisiloxane (5.36 mmol) and 0.88 mL of 1,1,3,3,5,5,7,7-octamethyltetrasiloxane (2.68 mmol) were mixed vigorously in a mechanical stirrer for 2 min. Mixing was repeated after the addition of 0.5 mL of hexane and 5 drops of a 2000 ppm Karstedt catalyst solution using a 500 μL syringe. 0.55 mL of tetrakis(dimethylsiloxy)silane (1.67 mmol) and 5 more drops of a 2000 ppm Karstedt catalyst solution, using a 500 μL syringe, were added to the mixture and the mixing was repeated. Film of the product was formed in a circular Teflon mold of dimension 50 mm (diameter)×1 mm (thickness).

Sample B: 1.0 g of 1,5-divinylhexamethyltrisiloxane (3.84 mmol) and 0.63 mL of 1,1,3,3,5,5,7,7-octamethyltetrasiloxane (1.92 mmol) were mixed vigorously in a mechanical stirrer for 2 min. Mixing was repeated after the addition of 0.5 mL of hexane and 2 drops of a 2000 ppm Karstedt catalyst solution using a 500 μL syringe. 0.39 mL of tetrakis(dimethylsiloxy)silane (1.2 mmol) was added to the mixture and the mixing was repeated. Film of the product was formed in a circular Teflon mold of dimension 50 mm (diameter)×1 mm (thickness).

The conductivity of Sample A was 0.1 pS/m, and the conductivity of Sample B was 0.01 pS/m. The conductivity values for Sample A and Sample B were about 2 orders of magnitude less than the corresponding values for Example 11. Hence, it appears that electrical conductivity of the hydrosilated network materials depends on the concentrations of the metal (such as Pt) and the carborane constituents.

Obviously, many modifications and variations of the present invention are possible in light of the above teachings. It is therefore to be understood that the claimed invention may be practiced otherwise than as specifically described.

What is claimed is:

1. A compound comprising a repeat unit comprising the formula:

—U'—SiR'$_2$—(O—SiR'$_2$)$_x$—U'-Q- wherein each Q comprises groups selected from the group consisting of —SiR$_2$—, —SiR$_2$—O—, —C≡C—C≡C—, and carboranyl;

wherein each R and R' is independently selected from the group consisting of alkyl, aryl, alkylaryl, haloalkyl, haloaryl, and mixtures thereof;

wherein each U' is an independently selected group selected from —CH$_2$—CH$_2$— and —CH=CH—;

wherein each x' is an independently selected positive integer; and wherein the compound is a linear polymer or oligomer.

2. The compound of claim 1, wherein the compound has the formula:

U-Q-U'—SiR'$_2$—(O—SiR'$_2$)$_x$—U'-Q-U;

wherein each U is an independently selected alkenyl group or alkynyl group.

3. The compound of claim 1, wherein the compound has the formula:

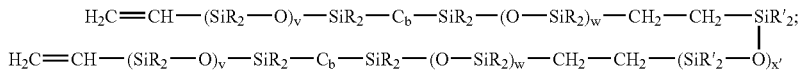
wherein each $C_b$ is an independently selected carboranyl group; and
wherein each v and w is an independently selected positive integer.
4. The compound of claim 3,
wherein each $C_b$ is independently selected from the group consisting of o-$CB_{10}H_{10}C$, m-$CB_{10}H_{10}C$, and p-$CB_{10}H_{10}C$;
wherein every R and R' is methyl; and
wherein every v and w is 1.
* * * * *